(12) United States Patent
Iwamatsu

(10) Patent No.: US 11,074,696 B2
(45) Date of Patent: Jul. 27, 2021

(54) IMAGE PROCESSING DEVICE, IMAGE PROCESSING METHOD, AND RECORDING MEDIUM STORING PROGRAM

(71) Applicant: NEC Corporation, Tokyo (JP)

(72) Inventor: Yosuke Iwamatsu, Tokyo (JP)

(73) Assignee: NEC CORPORATION, Tokyo (JP)

( * ) Notice: Subject to any disclaimer, the term of this patent is extended or adjusted under 35 U.S.C. 154(b) by 106 days.

(21) Appl. No.: 16/601,925

(22) Filed: Oct. 15, 2019

(65) Prior Publication Data

US 2020/0043175 A1 Feb. 6, 2020

Related U.S. Application Data

(63) Continuation of application No. 16/474,118, filed as application No. PCT/JP2017/046826 on Dec. 27, 2017.

(30) Foreign Application Priority Data

Jan. 5, 2017 (JP) .................................. 2017-000653

(51) Int. Cl.
*G06T 7/20* (2017.01)
*H04N 7/18* (2006.01)
*G06T 7/00* (2017.01)

(52) U.S. Cl.
CPC ............... *G06T 7/20* (2013.01); *G06T 7/97* (2017.01); *H04N 7/18* (2013.01); *G06T 2207/10016* (2013.01); *G06T 2207/30232* (2013.01)

(58) Field of Classification Search
CPC .. G06K 9/00771; G06K 9/00228; G06K 9/32; G06K 9/00785; G06K 2009/2045;
(Continued)

(56) References Cited

U.S. PATENT DOCUMENTS

| 6,687,386 B1* | 2/2004 | Ito ..................... G06K 9/00785 382/103 |
| 2011/0141288 A1* | 6/2011 | Huang ............... G06K 9/00979 348/169 |

FOREIGN PATENT DOCUMENTS

| JP | 2001-060269 A | 3/2001 |
| JP | 3768073 B2 | 4/2006 |

(Continued)

OTHER PUBLICATIONS

International Search Report for PCT Application No. PCT/JP2017/046826, dated Mar. 27, 2018.
(Continued)

*Primary Examiner* — Michael J Vanchy, Jr.
(74) *Attorney, Agent, or Firm* — Sughrue Mion, PLLC

(57) ABSTRACT

An image processing device includes at least one memory configured to store instructions and at least one processor configured to execute the instructions to: from input subject data that include positions of a plurality of subjects, detect subject appearance data including an appearing subject and subject disappearance data including a disappearing subject; based on the subject appearance data and the subject disappearance data that are detected and an appearance position distribution and a disappearance position distribution of subjects that are learned in advance, calculate appearance validity of the subject appearance data and disappearance validity of the subject disappearance data; and based on the appearance validity and the disappearance validity calculated, acquire a combination of subject appearance data and subject disappearance data detected, the combination satisfying a predetermined condition.

18 Claims, 26 Drawing Sheets

(58) Field of Classification Search
CPC ........... G06K 9/00201; G06K 9/00751; G06K 9/00812; G06K 9/00979; G06K 9/036; G06K 9/2054; G06K 9/2072; G06K 9/228; G06K 9/6256; G06K 9/6259; G06T 2207/10016; G06T 2207/30232; G06T 7/20; G06T 7/97; G06T 7/55; G06T 17/00; G06T 2207/10021; G06T 2207/10048; G06T 2207/30181; G06T 2207/30196; G06T 2207/30201; G06T 2207/30236; G06T 7/246; G06T 7/248; G06T 7/292; G06T 7/62; H04N 7/18; H04N 7/181; H04N 7/183; B61L 17/00; B61L 17/02; B61L 23/00; B61L 23/041; B61L 27/0077; G06F 16/784; G08B 13/1906; G08B 13/19613; G08B 1/147; G08B 1/169; G11B 27/034
See application file for complete search history.

(56) References Cited

FOREIGN PATENT DOCUMENTS

| | | |
|---|---|---|
| JP | 2013-196029 A | 9/2013 |
| JP | 2016-126624 A | 7/2016 |

OTHER PUBLICATIONS

English translation of Written opinion for PCT Application No. PCT/JP2017/046826.

\* cited by examiner

Fig.4

| FRAME NUMBER | FRAME TIME | SUBJECT NUMBER | SUBJECT AREA (CENTRAL COORDINATES) | SUBJECT QUALITY SCORE |
|---|---|---|---|---|
| 101 | 10 HR 15 MIN 20 SEC | 101-1 | (450, 40) | 0.5 |
| 101 | 10 HR 15 MIN 20 SEC | 101-2 | (520, 40) | 0.5 |
| 102 | 10 HR 15 MIN 21 SEC | 102-1 | (450, 200) | 0.6 |
| 102 | 10 HR 15 MIN 21 SEC | 102-2 | (460, 180) | 0.6 |
| 103 | 10 HR 15 MIN 22 SEC | 103-1 | (450, 200) | 0.7 |
| 103 | 10 HR 15 MIN 23 SEC | 103-2 | (380, 200) | 0.4 |
| 104 | 10 HR 15 MIN 24 SEC | 104-1 | (450, 440) | 0.8 |
| 104 | 10 HR 15 MIN 24 SEC | 104-2 | (60, 200) | 0.4 |
| 104 | 10 HR 15 MIN 24 SEC | 104-3 | (520, 40) | 0.5 |

Fig.5

| FRAME NUMBER | FRAME TIME | SUBJECT NUMBER | SUBJECT AREA (CENTRAL COORDINATES) | SUBJECT QUALITY SCORE | TRACKING NUMBER |
|---|---|---|---|---|---|
| 101 | 10 HR 15 MIN 20 SEC | 101-1 | (450, 40) | 0.5 | 1 |
| 101 | 10 HR 15 MIN 20 SEC | 101-2 | (520, 40) | 0.5 | 2 |
| 102 | 10 HR 15 MIN 21 SEC | 102-1 | (450, 200) | 0.6 | 1 |
| 102 | 10 HR 15 MIN 21 SEC | 102-2 | (460, 180) | 0.6 | 2 |
| 103 | 10 HR 15 MIN 22 SEC | 103-1 | (450, 200) | 0.7 | 3 |
| 103 | 10 HR 15 MIN 23 SEC | 103-2 | (380, 200) | 0.4 | 4 |
| 104 | 10 HR 15 MIN 24 SEC | 104-1 | (450, 440) | 0.8 | 3 |
| 104 | 10 HR 15 MIN 24 SEC | 104-2 | (60, 200) | 0.4 | 4 |
| 104 | 10 HR 15 MIN 24 SEC | 104-3 | (520, 40) | 0.5 | 5 |

Fig.7

| FRAME NUMBER | FRAME TIME | SUBJECT NUMBER | SUBJECT AREA (CENTRAL COORDINATES) | SUBJECT QUALITY SCORE | TRACKING NUMBER | APPEARANCE FLAG | DISAPPEARANCE FLAG |
|---|---|---|---|---|---|---|---|
| 101 | 10 HR 15 MIN 20 SEC | 101-1 | (450, 40) | 0.5 | 1 | 1 | 0 |
| 101 | 10 HR 15 MIN 20 SEC | 101-2 | (520, 40) | 0.5 | 2 | 1 | 0 |
| 102 | 10 HR 15 MIN 21 SEC | 102-1 | (450, 200) | 0.6 | 1 | 0 | 1 |
| 102 | 10 HR 15 MIN 21 SEC | 102-2 | (460, 180) | 0.6 | 2 | 0 | 1 |
| 103 | 10 HR 15 MIN 22 SEC | 103-1 | (450, 200) | 0.7 | 3 | 1 | 0 |
| 103 | 10 HR 15 MIN 23 SEC | 103-2 | (380, 200) | 0.8 | 4 | 1 | 0 |
| 104 | 10 HR 15 MIN 24 SEC | 104-1 | (450, 440) | 0.4 | 3 | 0 | 1 |
| 104 | 10 HR 15 MIN 24 SEC | 104-2 | (60, 200) | 0.4 | 4 | 0 | 1 |
| 104 | 10 HR 15 MIN 24 SEC | 104-3 | (520, 40) | 0.5 | 5 | 1 | 0 |

Fig.8

| REGION NUMBER (81) | x-COORDINATE RANGE (82) | y-COORDINATE RANGE (83) | APPEARANCE COUNT (84) | TOTAL APPEARANCE COUNT (85) |
|---|---|---|---|---|
| 1 | 0≤x<80 | 0≤y<80 | 0 | 100 |
| 2 | 80≤x<160 | 0≤y<80 | 0 | |
| 3 | 160≤x<240 | 0≤y<80 | 0 | |
| 4 | 240≤x<320 | 0≤y<80 | 0 | |
| 5 | 320≤x<400 | 0≤y<80 | 0 | |
| 6 | 400≤x<480 | 0≤y<80 | 40 | |
| 7 | 480≤x<560 | 0≤y<80 | 50 | |
| 8 | 560≤x<640 | 0≤y<80 | 0 | |
| 9 | 0≤x<80 | 80≤y<160 | 0 | |
| ... | ... | ... | ... | |
| 21 | 320≤x<400 | 160≤y<240 | 4 | |
| 22 | 400≤x<480 | 160≤y<240 | 6 | |
| ... | ... | ... | ... | |
| 48 | 560≤x<640 | 400≤x<480 | 0 | |

| REGION NUMBER | x-COORDINATE RANGE | y-COORDINATE RANGE | DISAPPEARANCE COUNT | TOTAL DISAPPEARANCE COUNT |
|---|---|---|---|---|
| 1 | 0≤x<80 | 0≤y<80 | 0 | 100 |
| 2 | 80≤x<160 | 0≤y<80 | 0 | |
| 3 | 160≤x<240 | 0≤y<80 | 0 | |
| 4 | 240≤x<320 | 0≤y<80 | 0 | |
| 5 | 320≤x<400 | 0≤y<80 | 0 | |
| 6 | 400≤x<480 | 0≤y<80 | 0 | |
| 7 | 480≤x<560 | 0≤y<80 | 0 | |
| 8 | 560≤x<640 | 0≤y<80 | 0 | |
| 9 | 0≤x<80 | 80≤y<160 | 0 | |
| ... | ... | ... | ... | |
| 22 | 400≤x<480 | 160≤y<240 | 5 | |
| ... | ... | ... | ... | |
| 25 | 0≤x<80 | 160≤y<240 | 50 | |
| ... | ... | ... | ... | |
| 46 | 400≤x<480 | 400≤y<480 | 45 | |
| ... | ... | ... | ... | |
| 48 | 560≤x<640 | 400≤y<480 | 0 | |

Fig.10

| Frame Number | Frame Time | Subject Number | Subject Area (Central Coordinates) | Subject Quality Score | Tracking Number | Appearance Flag | Appearance Validity | Disappearance Flag | Disappearance Validity |
|---|---|---|---|---|---|---|---|---|---|
| 101 | 10 HR 15 MIN 20 SEC | 101-1 | (450, 40) | 0.5 | 1 | 1 | 0.6 | 0 | NONE |
| 101 | 10 HR 15 MIN 20 SEC | 101-2 | (520, 40) | 0.5 | 2 | 1 | 0.5 | 0 | NONE |
| 102 | 10 HR 15 MIN 21 SEC | 102-1 | (450, 200) | 0.6 | 1 | 0 | NONE | 1 | 0.95 |
| 102 | 10 HR 15 MIN 21 SEC | 102-2 | (460, 180) | 0.6 | 2 | 0 | NONE | 1 | 0.95 |
| 103 | 10 HR 15 MIN 22 SEC | 103-1 | (450, 200) | 0.7 | 3 | 1 | 0.94 | 0 | NONE |
| 103 | 10 HR 15 MIN 22 SEC | 103-2 | (380, 200) | 0.4 | 4 | 1 | 0.96 | 0 | NONE |
| 104 | 10 HR 15 MIN 23 SEC | 104-1 | (450, 440) | 0.8 | 3 | 0 | NONE | 1 | 0.55 |
| 104 | 10 HR 15 MIN 24 SEC | 104-2 | (60, 200) | 0.4 | 4 | 0 | NONE | 1 | 0.5 |
| 104 | 10 HR 15 MIN 24 SEC | 104-3 | (520, 40) | 0.5 | 5 | 1 | 0.5 | 0 | NONE |

Fig. 11

| COMBINATION NUMBER | DISAPPEARING SUBJECT NUMBER | APPEARING SUBJECT NUMBER | TIME CONSISTENCY | IDENTITY SCORE | MATCHING TARGET INFORMATION |
|---|---|---|---|---|---|
| 1 | 102-1 | 101-1 | INCONSISTENT | NONE | NOT TARGET |
| 2 | 102-1 | 101-2 | INCONSISTENT | NONE | NOT TARGET |
| 3 | 102-1 | 103-1 | CONSISTENT | 0.893 | TARGET |
| 4 | 102-1 | 103-2 | CONSISTENT | 0.912 | TARGET |
| 5 | 102-1 | 104-3 | CONSISTENT | 0.475 | NOT TARGET |
| 6 | 102-2 | 101-1 | INCONSISTENT | NONE | NOT TARGET |
| 7 | 102-2 | 101-2 | INCONSISTENT | NONE | NOT TARGET |
| 8 | 102-2 | 103-1 | CONSISTENT | 0.893 | TARGET |
| 9 | 102-2 | 103-2 | CONSISTENT | 0.912 | TARGET |
| 10 | 102-2 | 104-3 | CONSISTENT | 0.475 | NOT TARGET |
| 11 | 104-1 | 101-1 | INCONSISTENT | NONE | NOT TARGET |
| 12 | 104-1 | 101-2 | INCONSISTENT | NONE | NOT TARGET |
| 13 | 104-1 | 103-1 | INCONSISTENT | NONE | NOT TARGET |
| 14 | 104-1 | 103-2 | INCONSISTENT | NONE | NOT TARGET |
| 15 | 104-1 | 104-3 | INCONSISTENT | NONE | NOT TARGET |
| 16 | 104-2 | 101-1 | INCONSISTENT | NONE | NOT TARGET |
| 17 | 104-2 | 101-2 | INCONSISTENT | NONE | NOT TARGET |
| 18 | 104-2 | 103-1 | INCONSISTENT | NONE | NOT TARGET |
| 19 | 104-2 | 103-2 | INCONSISTENT | NONE | NOT TARGET |
| 20 | 104-2 | 104-3 | INCONSISTENT | NONE | NOT TARGET |

Fig.13

| FRAME NUMBER | FRAME TIME | SUBJECT NUMBER | SUBJECT AREA (CENTRAL COORDINATES) | SUBJECT QUALITY SCORE | TRACKING NUMBER | RE-TRACKING NUMBER |
|---|---|---|---|---|---|---|
| 101 | 10 HR 15 MIN 20 SEC | 101-1 | (450, 40) | 0.5 | 1 | 1 |
| 101 | 10 HR 15 MIN 20 SEC | 101-2 | (520, 40) | 0.5 | 2 | 2 |
| 102 | 10 HR 15 MIN 21 SEC | 102-1 | (450, 200) | 0.6 | 1 | 1 |
| 102 | 10 HR 15 MIN 21 SEC | 102-2 | (460, 180) | 0.6 | 2 | 2 |
| 103 | 10 HR 15 MIN 22 SEC | 103-1 | (450, 200) | 0.7 | 3 | 1 |
| 103 | 10 HR 15 MIN 23 SEC | 103-2 | (380, 200) | 0.4 | 4 | 2 |
| 104 | 10 HR 15 MIN 24 SEC | 104-1 | (450, 440) | 0.8 | 3 | 1 |
| 104 | 10 HR 15 MIN 24 SEC | 104-2 | (60, 200) | 0.4 | 4 | 2 |
| 104 | 10 HR 15 MIN 24 SEC | 104-3 | (520, 40) | 0.5 | 5 | 5 |

Fig.23

| FRAME NUMBER 231 | FRAME TIME 232 | SUBJECT NUMBER 233 | SUBJECT AREA 234 | | | | SUBJECT QUALITY SCORE 235 |
|---|---|---|---|---|---|---|---|
| | | | CENTRAL COORDINATES 2341 | WIDTH (w) 2342 | HEIGHT (h) 2343 | DIRECTION (p) 2344 | |
| 201 | 10 HR 16 MIN 20 SEC | 201-1 | (40, 40) | 30 | 60 | -10 | 0.4 |
| 201 | 10 HR 16 MIN 20 SEC | 201-2 | (50, 50) | 50 | 100 | -5 | 0.5 |
| 202 | 10 HR 16 MIN 21 SEC | 202-1 | (570, 410) | 100 | 150 | 40 | 0.4 |
| 202 | 10 HR 16 MIN 21 SEC | 202-2 | (580, 420) | 60 | 120 | 25 | 0.6 |

| FRAME NUMBER 231 | FRAME TIME 232 | SUBJECT NUMBER 233 | SUBJECT AREA 234 | | | | SUBJECT QUALITY SCORE 235 | TRACKING NUMBER 241 | APPEARANCE FLAG 242 | DISAPPEARANCE FLAG 243 |
|---|---|---|---|---|---|---|---|---|---|---|
| | | | CENTRAL COORDINATES 2341 | WIDTH (w) 2342 | HEIGHT (h) 2343 | DIRECTION (p) 2344 | | | | |
| 201 | 10 HR 16 MIN 20 SEC | 201-1 | (40, 40) | 30 | 60 | -10 | 0.4 | 1 | 1 | 0 |
| 201 | 10 HR 16 MIN 20 SEC | 201-2 | (50, 50) | 50 | 100 | -5 | 0.5 | 2 | 1 | 0 |
| 202 | 10 HR 16 MIN 21 SEC | 202-1 | (570, 410) | 100 | 150 | 40 | 0.4 | 1 | 0 | 1 |
| 202 | 10 HR 16 MIN 21 SEC | 202-2 | (580, 420) | 60 | 120 | 25 | 0.6 | 2 | 0 | 1 |

| SUB-REGION NUMBER | SIZE (w × h) | DIRECTION (p) | x-COORDINATE RANGE | y-COORDINATE RANGE | APPEARANCE COUNT | TOTAL APPEARANCE COUNT |
|---|---|---|---|---|---|---|
| 1 | w × h < 2500 | −90 ≤ p < −30 | 0 ≤ x < 80 | 0 ≤ y < 80 | 0 | 100 |
| 2 | 2500 ≤ w × h < 10000 | −90 ≤ p < −30 | 0 ≤ x < 80 | 0 ≤ y < 80 | 0 | |
| 3 | 10000 ≤ w × h < 22500 | −90 ≤ p < −30 | 0 ≤ x < 80 | 0 ≤ y < 80 | 0 | |
| 4 | 22500 ≤ w × h | −90 ≤ p < −30 | 0 ≤ x < 80 | 0 ≤ y < 80 | 0 | |
| 5 | w × h < 2500 | −30 ≤ p < 30 | 0 ≤ x < 80 | 0 ≤ y < 80 | 40 | |
| 6 | 2500 ≤ w × h < 10000 | −30 ≤ p < 30 | 0 ≤ x < 80 | 0 ≤ y < 80 | 60 | |
| 7 | 10000 ≤ w × h < 22500 | −30 ≤ p < 30 | 0 ≤ x < 80 | 0 ≤ y < 80 | 0 | |
| 8 | 22500 ≤ w × h | −30 ≤ p < 30 | 0 ≤ x < 80 | 0 ≤ y < 80 | 0 | |
| ... | ... | ... | ... | ... | ... | |
| 576 | 22500 ≤ w × h | 30 ≤ p < 90 | 560 ≤ x < 640 | 400 ≤ x < 480 | 0 | |

Fig.26

| SUB-REGION NUMBER 261 | SIZE (w × h) 262 | DIRECTION (p) 263 | x-COORDINATE RANGE 264 | y-COORDINATE RANGE 265 | DISAPPEARANCE COUNT 266 | TOTAL DISAPPEARANCE COUNT 267 |
|---|---|---|---|---|---|---|
| 1 | w × h < 2500 | −90 ≦ p < −30 | 0 ≦ x < 80 | 0 ≦ y < 80 | 0 | 100 |
| 2 | 2500 ≦ w × h < 10000 | −90 ≦ p < −30 | 0 ≦ x < 80 | 0 ≦ y < 80 | 0 | |
| 3 | 10000 ≦ w × h < 22500 | −90 ≦ p < −30 | 0 ≦ x < 80 | 0 ≦ y < 80 | 0 | |
| 4 | 22500 ≦ w × h | −90 ≦ p < −30 | 0 ≦ x < 80 | 0 ≦ y < 80 | 0 | |
| ... | ... | ... | ... | ... | ... | |
| 575 | 10000 ≦ w × h < 22500 | 30 ≦ p < 90 | 560 ≦ x < 640 | 400 ≦ x < 480 | 70 | |
| 576 | 22500 ≦ w × h | 30 ≦ p < 90 | 560 ≦ x < 640 | 400 ≦ x < 480 | 30 | |

| FRAME NUMBER 231 | FRAME TIME 232 | SUBJECT NUMBER 233 | SUBJECT AREA 234 | | | | SUBJECT QUALITY SCORE 235 | TRACKING NUMBER 241 | APPEARANCE FLAG 242 | APPEARANCE VALIDITY 274 | DISAPPEARANCE FLAG 243 | DISAPPEARANCE VALIDITY 275 |
|---|---|---|---|---|---|---|---|---|---|---|---|---|
| | | | CENTRAL COORDINATES 2341 | WIDTH (w) 2342 | HEIGHT (h) 2343 | DIRECTION (p) 2344 | | | | | | |
| 201 | 10 HR 16 MIN 20 SEC | 201-1 | (40, 40) | 30 | 60 | -10 | 0.4 | 1 | 1 | 0.6 | 0 | NONE |
| 201 | 10 HR 16 MIN 20 SEC | 201-2 | (50, 50) | 50 | 100 | -5 | 0.5 | 2 | 1 | 0.4 | 0 | NONE |
| 202 | 10 HR 16 MIN 21 SEC | 202-1 | (570, 410) | 100 | 150 | 40 | 0.4 | 1 | 0 | NONE | 1 | 0.3 |
| 202 | 10 HR 16 MIN 21 SEC | 202-2 | (580, 420) | 60 | 120 | 25 | 0.6 | 2 | 0 | NONE | 1 | 1.0 |

270

IMAGE PROCESSING DEVICE, IMAGE PROCESSING METHOD, AND RECORDING MEDIUM STORING PROGRAM

The present application is a Continuation application of Ser. No. 16/474,118 filed on Jun. 27, 2019, which is a National Stage Entry of PCT/JP2017/046826 filed on Dec. 27, 2017, which claims priority from Japanese Patent Application 2017-000653 filed on Jan. 5, 2017, the contents of all of which are incorporated herein by reference, in their entirety.

TECHNICAL FIELD

The present disclosure relates to an image processing device, a video monitoring for video surveillance system, an image processing method, and the like.

BACKGROUND ART

Recent years, associated with advancement of information processing technology, development of analysis engines for analyzing video data and image data has been carried out. For example, face detection engines for detecting the face of a person from video data and image data, facial feature extraction engines for extracting feature data of the face, and face matching engines for matching feature data of the face and thereby identifying a person have been developed.

By combining a plurality of analysis engines, analysis systems capable of obtaining various analysis results from video data have been developed. For example, an analysis system that performs analysis processing of, by performing processing on video data input from a camera in series using a face detection engine, a facial feature extraction engine, and a face matching engine, identifying and outputting identifiers (IDs) of the faces of persons in the video data has been developed.

As a configuration of such an analysis system, a distributed configuration configured such that primary processing is performed by a processing device arranged close to a video input device, such as a camera, interim analysis result data are transferred to a remote processing device placed on a cloud or the like, and subsequent processing is performed by the remote processing device and a result thereof is subsequently displayed is often used. For example, a configuration of an analysis system in which a processing device arranged close to a camera detects the face of a person and a processing device on a cloud extracts and matches feature data of the face and displays information of the identified person has been considered.

In such a configuration, it is desirable that the transfer amount of interim analysis result data is less than or equal to a certain level in order to reduce a load on a network between processing devices. Thus, processing (hereinafter, referred to as effective data extraction processing) of, after deleting duplicate or resembling data and extracting only data determined to have been video-captured under good conditions out of interim analysis result data, transferring data effective for analysis is performed.

As a method of the effective data extraction processing, a method of, by tracking subjects, such as persons, in video data, identifying an identical subject among frames and extracting images of the subject video-captured under good conditions out of the images of the identical subject is conceivable. Examples of a technology performing such subject tracking are described in PTLs 1 and 2.

PTL 1 discloses an example of a method of tracking subjects in video data. A technology described in PTL 1, by means of a first discriminator that, using acquired images including an object, performs learning about the object, discriminates areas of the object in respective images from which the object is to be discriminated and thereby tracks the object and determines whether or not hiding has occurred to the discriminated areas of the object. As used herein, the hiding refers to a state in which a subject to be recognized is hidden by other subjects, obstacles, or the like. When determining that hiding has occurred, the technology, by means of a second discriminator that, using unhidden areas in the areas of the object, performs learning about the object, discriminates portions relating to the object in the respective images from which the object is to be discriminated and thereby tracks the object.

PTL 2 discloses another example of the method of tracking subjects in video data. The method described in PTL 2 detects an object in an image and registers the detected object as a template image. The method performs matching processing of a present input image with a plurality of template images of an identical object that are registered based on past input images imaged at times different from one another and determines a position at which the degree of matching is highest or a position at which the degree of matching is higher than or equal to a predetermined value among the input images as the present object position. The method described in PTL 2, by setting the image including the present position as a new template image, further tracks the subject.

CITATION LIST

Patent Literature

[PTL 1] JP 2016-126624 A
[PTL 2] JP 3768073 B

SUMMARY OF INVENTION

Technical Problem

In the above-described tracking method described in PTL 1, it is required that no portion of the area that a subject occupies is hidden. However, a case where a subject is entirely hidden often occurs in practical video data, and, in such a case, tracking cannot be continued. When the effective data extraction processing is performed using the tracking method described in PTL 1, such a case causes an identical subject to be recognized as a plurality of different subjects, resulting in increase in the amount of data of subjects to be extracted.

Meanwhile, in the above-described tracking method described in PTL 2, although tracking can be continued even when a subject is temporarily hidden, a plurality of matching processes are required to be carried out. That is, hiding causes, with respect to objects the tracking of which is interrupted, all the combinations of the objects before the interruption of tracking and the objects after the interruption of tracking to be matched. Therefore, in the technology described in PTL 2, a processing load increases. Thus, it is difficult to perform real-time processing, such as promptly processing video data from a camera and immediately displaying analysis results. Therefore, the effective data extraction processing performed using the tracking method described in PTL 2 causes a processing load to increase.

That is, in the above-described technologies described in PTLs 1 and 2, it is difficult to suppress increase in the amount of data generated by interruption of tracking while reducing processing load.

The present disclosure is made in consideration of the above-described problems, and an object of the present disclosure is to provide a technology capable of suppressing increase in the amount of data generated by interruption of tracking while reducing processing load.

Solution to Problem

An image processing device according to one aspect of the present disclosure includes:

detection means for, from input subject data that include positions of a plurality of subjects, detecting subject appearance data including an appearing subject and subject disappearance data including a disappearing subject;

calculation means for, based on the subject appearance data and the subject disappearance data that are detected by the detection means and an appearance position distribution and a disappearance position distribution of subjects that are learned in advance, calculating appearance validity of the subject appearance data and disappearance validity of the subject disappearance data; and acquisition means for, based on the appearance validity and the disappearance validity calculated by the calculation means, acquiring a combination of subject appearance data and subject disappearance data detected by the detection means, the combination satisfying a predetermined condition.

A video monitoring system according to one aspect of the present disclosure includes:

subject detection means for, from video data obtained by video-capturing a plurality of subjects, detecting the subjects;

subject tracking means for tracking the detected subjects and outputting tracking results including positions of the subjects as subject data;

detection means for, from the subject data, detecting subject appearance data including an appearing subject and subject disappearance data including a disappearing subject;

calculation means for, based on subject appearance data and subject disappearance data that are detected by the detection means and an appearance position distribution and disappearance position distribution of subjects that are learned in advance, calculating appearance validity of the subject appearance data and disappearance validity of the subject disappearance data;

acquisition means for, based on appearance validity and disappearance validity calculated by the calculation means, acquiring a combination of subject appearance data and subject disappearance data detected by the detection means, the combination satisfying a predetermined condition;

matching means for matching subjects included in a combination that the acquisition means acquired with each other; and subject selection means for, based on a result of matching by the matching means, using subject quality scores each of which represents quality of a subject and that are calculated using a video capturing condition of the subjects, selecting, out of the subject data, subject data satisfying another predetermined condition.

An image processing device according to one aspect of the present disclosure includes from input subject data that include positions of a plurality of subjects, detecting subject appearance data including an appearing subject and subject disappearance data including a disappearing subject;

based on the subject appearance data and subject disappearance data that are detected and an appearance position distribution and disappearance position distribution of subjects that are learned in advance, calculating appearance validity of the subject appearance data and disappearance validity of the subject disappearance data; and based on the appearance validity and the disappearance validity that are calculated, acquiring a combination of the subject appearance data and the subject disappearance data that are detected, the combination satisfying a predetermined condition.

Note that a computer program causing a computer to achieve the above-described respective devices or methods and a computer-readable non-transitory recording medium storing the computer program are also included in the scope of the present invention.

Advantageous Effects of Invention

According to the present disclosure, it is possible to suppress increase in the amount of data generated by interruption of tracking while reducing processing load.

BRIEF DESCRIPTION OF DRAWINGS

FIG. 4 is a diagram illustrating an example of a subject detection result;

FIG. 5 is a diagram illustrating another example of the subject tracking result;

FIG. 7 is a diagram illustrating an example of subject detection data;

FIG. 8 is a diagram illustrating an example of an appearance position distribution;

FIG. 9 is a diagram illustrating an example of a disappearance position distribution;

FIG. 10 is a diagram illustrating an example of a validity calculation result;

FIG. 11 is a diagram illustrating an example of a combination result;

FIG. 13 is a diagram illustrating an example of a subject re-tracking result;

FIG. 23 is a diagram illustrating an example of a subject detection result;

FIG. 24 is a diagram illustrating an example of subject detection data;

FIG. 25 is a diagram illustrating an example of an appearance position distribution in a third example embodiment;

FIG. 26 is a diagram illustrating an example of a disappearance position distribution in the third example embodiment;

FIG. 27 is a diagram illustrating an example of a validity calculation result.

EXAMPLE EMBODIMENT

First Example Embodiment

Figure 1:
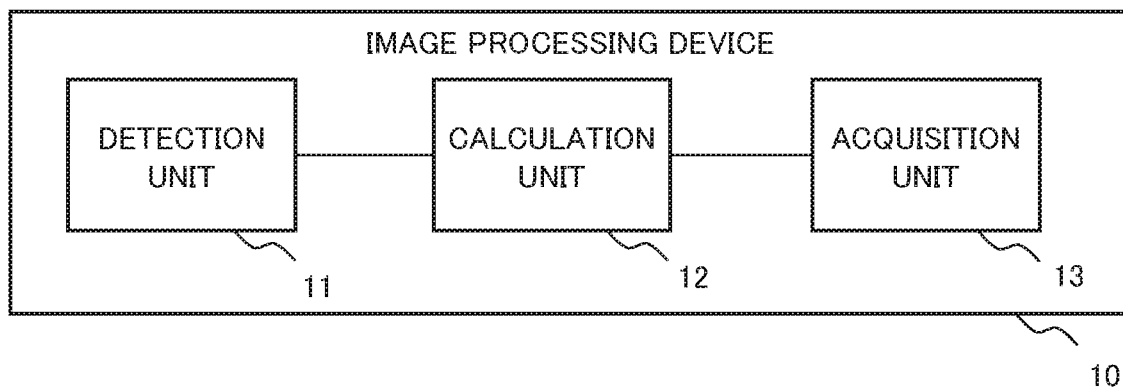
FIG. 1 is a functional block diagram illustrating an example of a functional configuration of an image processing device according to a first example embodiment.

A first example embodiment of the present disclosure will be described with reference to the accompanying drawings. FIG. 1 is a block diagram illustrating an example of a functional configuration of an image processing device 10 according to the present example embodiment. As illustrated in FIG. 1, the image processing device 10 according to the present example embodiment includes a detection unit 11, a calculation unit 12, and an acquisition unit 13.

The detection unit 11 detects, from subject data that are input to the image processing device 10 and include positions of a plurality of subjects, subject appearance data including an appearing subject and subject disappearance data including a disappearing subject. The subject data input to the image processing device 10, for example, include information representing positions of each subject in respective frames, the positions having been identified from video data that include a plurality of frames and were video-imaged by a video imaging device or the like. When two subjects are included in a frame (referred to as a first frame), the subject data include information representing a position of each of the two subjects in the first frame. When the same subjects as the two subjects included in the first frame are included in a second frame that is a frame succeeding to the first frame, the subject data include information indicating that the subjects in the second frame are the same subjects as the subjects in the first frame and information representing positions of the subjects in the second frame.

When a subject enters an angle of view of the video imaging device acquiring video data, the subject becomes included (appears) in the video data. The detection unit 11 detects, from the subject data including positions of subjects identified from the video data, subject appearance data including information representing a position of the subject in a frame in which the subject is first included (appears) on the time axis. When a subject present in the angle of view of the video imaging device acquiring video data moves out of the angle of view, the subject becomes not included in the video data (the subject disappears from the video data). The detection unit 11 detects, from the subject data including positions of subjects identified from the video data, subject disappearance data including information representing a position of the subject in a frame immediately before the subject disappears. That is, the detection unit 11 detects subject disappearance data including information representing a position of the subject in a frame in which the subject is last included on the time axis.

The calculation unit 12 calculates, based on the subject appearance data and the subject disappearance data detected by the detection unit 11 and an appearance position distribution and disappearance position distribution of subjects that are learned in advance, appearance validity of the subject appearance data and disappearance validity of the subject disappearance data. The appearance position distribution is data obtained by, with respect to each position in frames, calculating the total number of subjects that appeared at the position and is data obtained through learning using past subject data. Similarly, the disappearance position distribution is data obtained by, with respect to each position in frames, calculating the total number of subjects that disappeared and were present at the position immediately before the disappearance and is data obtained through learning using past subject data. The calculation unit 12 calculates, based on such the appearance position distribution and the disappearance position distribution of subjects and subject appearance data and subject disappearance data, appearance validity of the subject appearance data and disappearance validity of the subject disappearance data.

The appearance validity represents a degree of a difference between an appearance position of a subject appearing at a first-time in a frame in the video and a past position in the past appearance position distribution. Each of the appearance validity and the disappearance validity is represented by, for example, a numerical value from 0 to 1. An appearance validity value close to 1 indicates that the validity is low that the associated subject is a subject that appeared at the position included in the subject appearance data. An appearance validity value close to 1 indicates that the possibility is high that the subject that is detected to be an appearing subject is not an appearing subject but a subject the tracking of which was interrupted because of hiding and the like.

The disappearance validity represents a degree of a difference between a presence position of a subject existing in a frame by a subject immediately before a disappearance of the subject from the video and a past position in the past disappearance position distribution. A disappearance validity value close to 1 indicates that the validity is low that the associated subject was last included in the video data at the associated position, that is, the validity is low that the subject disappeared after the position included in the subject disappearance data. A disappearance validity value close to 1 indicates that the possibility is high that the subject that is detected to be a disappearing subject is not a disappearing subject but a subject the tracking of which was interrupted. The calculation unit 12 outputs calculated appearance validity and disappearance validity to the acquisition unit 13 in conjunction with the associated subject appearance data and subject disappearance data, respectively.

Figure 2:
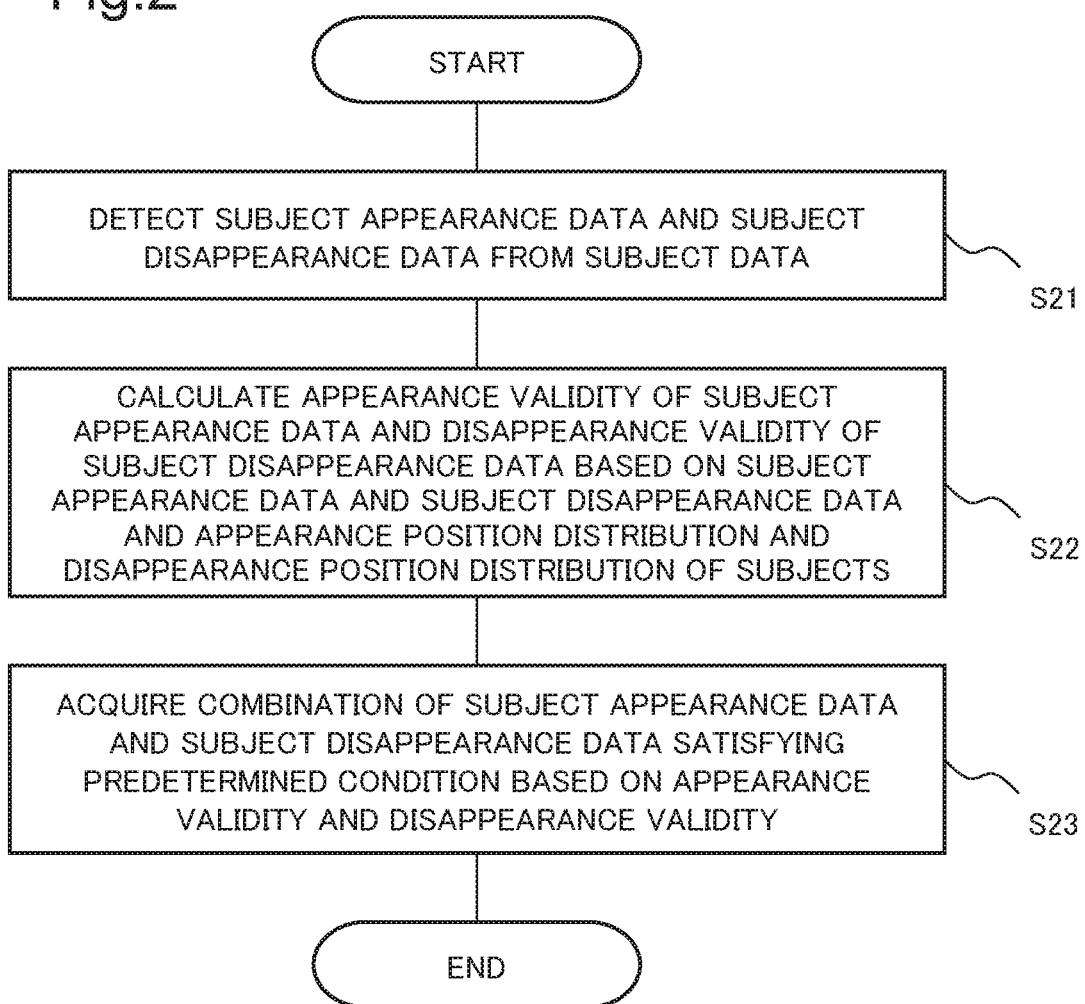
FIG. 2 is a flowchart illustrating an example of a processing flow of the image processing device according to the first example embodiment.

The acquisition unit 13 acquires, based on appearance validity and disappearance validity calculated by the calculation unit 12, a combination(s) of subject appearance data and subject disappearance data detected by the detection unit 11 that satisfy(ies) a predetermined condition. The predetermined condition is, for example, a condition for a combination(s) requiring the number of the combinations to be less than or equal to a predetermined threshold value. This configuration enables the acquisition unit 13 to acquire data having a possibility that a subject included in the subject appearance data and a subject included in the subject disappearance data are the same subject, as data on which matching is to be performed as tracking targets. FIG. 2 is a flowchart illustrating an example of a processing flow of the image processing device 10 according to the present example embodiment. As illustrated in FIG. 2, the detection unit 11 detects, from subject data, subject appearance data including an appearing subject and subject disappearance data including a disappearing subject (step S21).

Next, the calculation unit 12 calculates, based on the subject appearance data and subject disappearance data detected by the detection unit 11 and an appearance position distribution and disappearance position distribution of subjects that are learned in advance, appearance validity of the subject appearance data and disappearance validity of the subject disappearance data (step S22).

Subsequently, the acquisition unit 13 acquires, based on the appearance validity and the disappearance validity calculated by the calculation unit 12, a combination(s) of subject appearance data and subject disappearance data detected by the detection unit 11 that satisfy(ies) a predetermined condition (step S23).

As described above, the image processing device 10 according to the present example embodiment, using the past appearance position distribution and disappearance position distribution of subjects that are obtained through learning and subject appearance data and subject disappearance data that are detected by the detection unit 11, calculates appearance validity of the subject appearance data and disappearance validity of the subject disappearance data. The appearance validity of subject appearance data is a value indicating the validity that a subject included in the subject appearance data is an appearing subject and the disappearance validity of the subject disappearance data is a value indicating the validity that a subject included in the subject disappearance data is a disappearing subject. The acquisition unit 13 acquires, based on the appearance validity and the disappearance validity, a combination(s) of subject appearance data and subject disappearance data that satisfy(ies) a predetermined condition.

This configuration enables the image processing device 10 to treat two subjects that were determined to be a disappearing subject and an appearing subject because tracking interruption occurred, as subjects having a high possibility of being an identical subject again. This capability enables the image processing device 10 to suppress increase in the amount of data that may occur due to tracking interruption.

In addition, the image processing device 10 acquires a combination(s) satisfying a predetermined condition among the combinations of subject appearance data and subject disappearance data. The predetermined condition is, for example, a condition requiring the number of combinations to be less than or equal to a predetermined threshold value. This configuration enables the image processing device 10 to control, to less than or equal to a predetermined threshold value, the amount of processing of matching processing performed, on the occasion of tracking, between a subject(s) included in the subject disappearance data in the acquired combination(s) and a subject(s) included in the subject appearance data in the combination(s). This capability enables the image processing device 10 to limit a load required to perform the matching processing.

Therefore, the image processing device 10 according to the present example embodiment, while enabling a processing load required to perform, for example, processing of extracting data effective for analysis of video out of the video data to be reduced, enables increase in the amount of effective data caused by tracking interruption to be suppressed.

Second Example Embodiment

Figure 3:
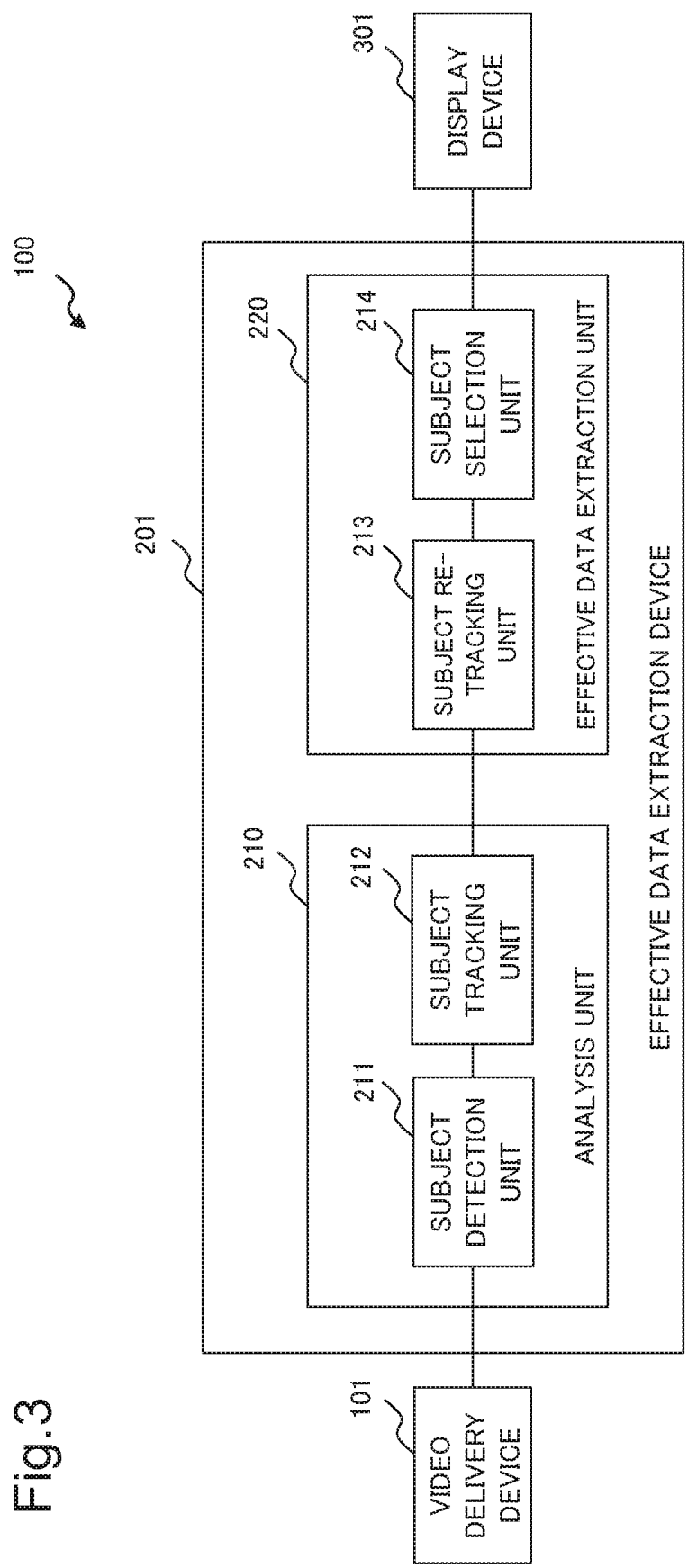
FIG. 3 is a block diagram illustrating an example of a configuration of a video monitoring system according to a second example embodiment.

Next, a second example embodiments of the present disclosure based on the above-described first example embodiment will be described with reference to the accompanying drawings. FIG. 3 is a block diagram illustrating an example of a configuration of a video monitoring system 100 according to the present example embodiment. As illustrated in FIG. 3, the video monitoring system 100 includes a video delivery device 101, an effective data extraction device 201, and a display device 301.

The video delivery device 101 delivers video data to the effective data extraction device 201. The video delivery device 101 is achieved by a video capturing device (video capturing unit), such as a video camera, a monitoring camera, a network camera, and an intelligent camera, that video-captures subjects. The video delivery device 101 delivers video-captured video data to the effective data extraction device 201. Note that the video delivery device 101 may provide the effective data extraction device 201 with, in conjunction with video data, information representing conditions (luminance and the like) and camera parameters indicating the direction, setting, and the like of a camera at the time of video-capturing of the video data.

The effective data extraction device 201 performs analysis processing and effective data extraction processing on video data received from the video delivery device 101. The display device 301 displays a result of analysis in the effective data extraction device 201 on a display unit. The display device 301 is achieved by, for example, a liquid crystal display.

The effective data extraction device 201 includes an analysis unit 210 and an effective data extraction unit 220. The analysis unit 210 performs analysis processing, using video data from the video delivery device 101. As illustrated in FIG. 3, the analysis unit 210 includes a subject detection unit 211 and a subject tracking unit 212. The effective data extraction unit 220 performs effective data extraction processing, using an analysis result output from the analysis unit 210. The effective data extraction unit 220 includes a subject re-tracking unit 213 and a subject selection unit 214.

The subject detection unit 211 detects subjects included in video data. The subject detection unit 211 receives video data delivered from the video delivery device 101. The subject detection unit 211 divides received video data into frames and detects one or a plurality of subjects with respect to each frame. When a subject is included in a frame, the subject detection unit 211 extracts an area that the detected subject occupies in the frame as a subject area from the frame. Although, in the present example embodiment, it is assumed that the subject detection unit 211 uses the central coordinates of a subject area as information representing the subject area, the subject detection unit 211 may use, instead of the central coordinates, for example, the coordinates of the top left corner of the subject area or the coordinates representing another position. Note that, since a subject area represents a position of a subject in a frame, a subject area is also referred to as a position of a subject.

The subject detection unit 211 assigns each detected subject a subject number for uniquely identifying the subject. The subject detection unit 211 outputs subject detection results each of which includes a subject number and information representing a subject area.

An example of subject detection results output by the subject detection unit 211 is illustrated in FIG. 4. FIG. 4 is a diagram illustrating an example of a subject detection result 40. As illustrated in FIG. 4, the subject detection result 40 includes frame numbers 41, frame times 42, subject numbers 43, subject areas 44, and subject quality scores 45. Note that the subject detection result 40 may include information other than the information illustrated in FIG. 4.

Each frame number 41 is an identifier for identifying a frame in which a subject is detected. Each frame time 42 indicates a time at which a frame was video-captured. Each subject number 43 is, as described above, a number for identifying a subject. Each subject area 44 is information representing an area that a detected subject occupies in a frame and, in FIG. 4, is represented by central coordinates, as described above.

Each subject quality score 45 represents quality of a subject in a frame, such as image quality. The subject detection unit 211 calculates a subject quality score 45 with respect to each subject, based on information representing conditions and camera parameters at the time of video-capturing of video data received from the image delivery device 101. The subject quality score 45 may be, for example, a value representing conditions at the time of video-capturing or a value calculated from the conditions at the time of video-capturing. The conditions at the time of video-capturing may be any conditions as long as being conditions relating to quality, such as luminance at the time of video-capturing, distance to the subject, and a video-capturing time. In addition, the calculation method of the subject quality score 45 is not limited to a specific method, and any method may be employed.

As illustrated in FIG. 4, a frame with a frame number "101" includes a subject with a subject number "101-1" and a subject with a subject number "101-2". An area that the subject with the subject number "101-1" occupies in the frame is a subject area having central coordinates of (450, 40). An area that the subject with the subject number "101-2" occupies in the frame is a subject area having central coordinates of (520, 40). The subject quality scores of both subjects are "0.5".

As described above, the subject detection unit 211 detects subjects from the respective frames in the video data and outputs information that is related to the detected subjects and is extracted from the video data as the subject detection results 40.

The subject tracking unit 212 tracks subjects by determining whether or not subjects included in the respective frames are identical subjects. The subject tracking unit 212 receives the subject detection result 40 from the subject detection unit 211. The subject tracking unit 212, referring to the subject areas 44 and the like included in the subject detection result 40, determines whether or not subjects included in the frames are identical between frames. The subject tracking unit 212, for example, determines whether or not the subject with the subject number "101-1" included in the frame with the frame number "101" included in the subject detection result 40 illustrated in FIG. 4 is identical to the subject with the subject number "102-1" included in a frame with a frame number "102" included in the subject detection result 40. In the determination processing, any method may be employed as a method for determining whether or not subjects are identical between frames. For example, whether or not subjects are identical between frames may be determined by determining whether or not a difference in the central coordinates between the subjects is less than a predetermined threshold value. The subject tracking unit 212 assigns subjects determined to be an identical subject between frames an identifier (referred to as a tracking number) indicating that the subjects are an identical subject. The subject tracking unit 212 associates assigned tracking numbers with the respective records in the subject detection result 40. In the respective record in the subject detection result 40, subject numbers 43 are included. The subject tracking unit 212 outputs, as a subject tracking result 50, the subject detection result 40 with which tracking numbers are associated.

An example of the subject tracking result 50 output by the subject tracking unit 212 is illustrated in FIG. 5. FIG. 5 is a diagram illustrating an example of the subject tracking result 50. As illustrated in FIG. 5, the subject tracking result 50 includes the frame numbers 41, the frame times 42, the subject numbers 43, the subject areas 44, the subject quality scores 45, and tracking numbers 56. Note that the subject tracking result 50 may include information other than the information illustrated in FIG. 5.

When the subject with the subject number "101-1" and the subject with the subject number "102-1" are determined to be an identical subject by the subject tracking unit 212, the same tracking number is associated with the record with the subject number "101-1" and the record with the subject number "102-1". As illustrated in FIG. 5, a tracking number "1" is associated with the record with the subject number "101-1" and the record with the subject number "102-1". Since this tracking number association clarifies that a subject included in the frame with the frame number "101" is also included in the frame with the frame number "102", it becomes possible to track the subject.

The subject tracking unit 212 outputs the subject tracking result 50 to the subject re-tracking unit 213. Note that, in the present example embodiment, the respective records in the subject tracking result 50 are also referred to as subject data. The subject data may be the respective records themselves in the subject tracking result 50. The subject data are required to include positions of the respective ones of a plurality of subjects and, specifically, to include the subject areas 44 and the tracking numbers 56 in the records in the subject tracking result 50. In the present example embodiment, a description will be made assuming that the subject data are the respective records included in the subject tracking result 50.

The subject re-tracking unit 213 is an example of the image processing device 10 according to the first example embodiment described above. In other words, the effective data extraction device 201 includes the above-described image processing device 10 as the subject re-tracking unit 213. The subject re-tracking unit 213 receives a subject tracking result from the subject tracking unit 212 and calculates a degree of possibility that tracking was interrupted. The subject re-tracking unit 213 matches subjects having a high possibility that tracking thereof was interrupted with each other and thereby determines again whether or not the subjects are an identical subject. The subject re-tracking unit 213 outputs a subject re-tracking result that is a result of the matching.

Figure 6:
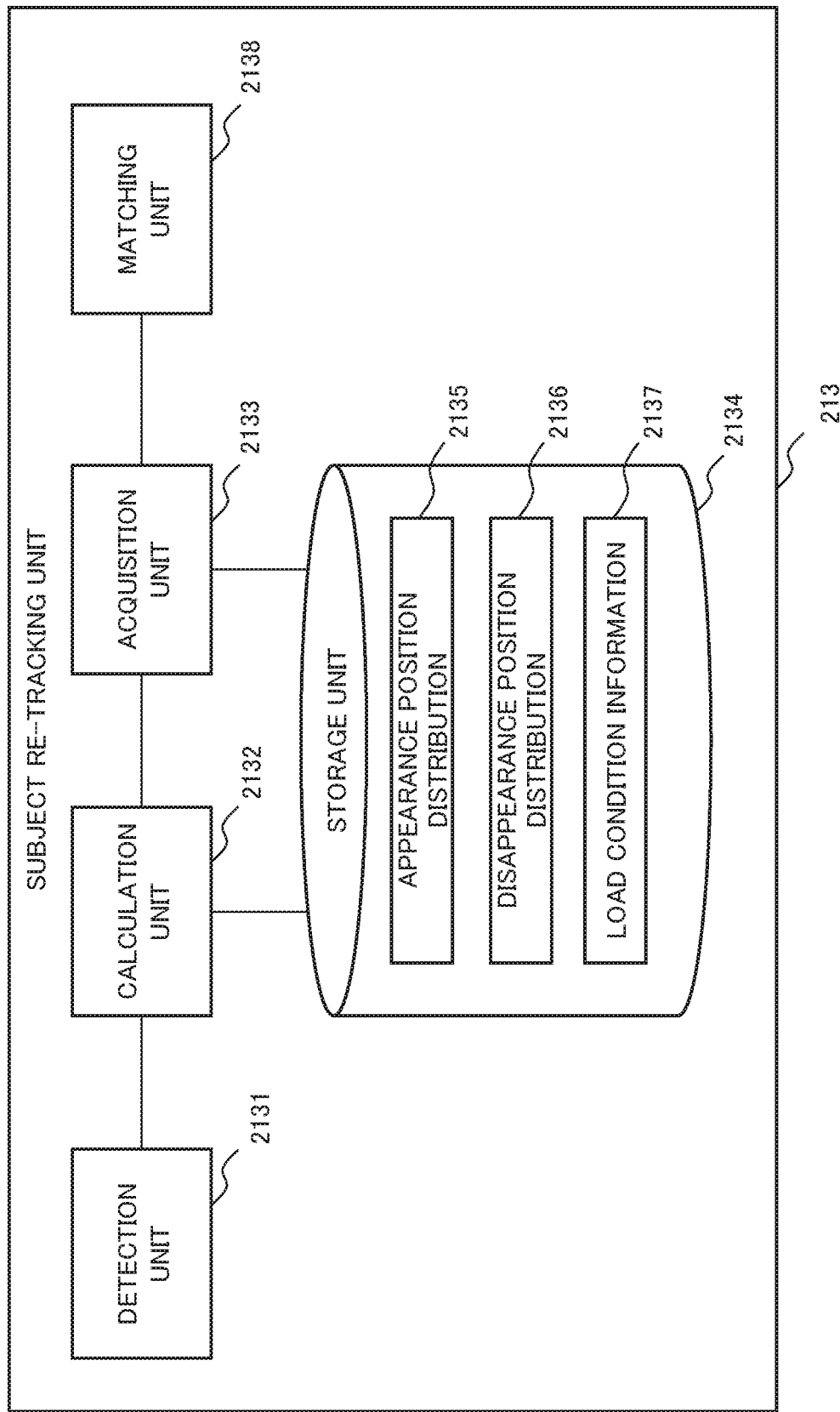
FIG. 6 is a block diagram illustrating an example of a configuration of a subject re-tracking unit in the second example embodiment.

FIG. 6 is a block diagram illustrating an example of a configuration of the subject re-tracking unit 213 in the present example embodiment. As illustrated in FIG. 6, the subject re-tracking unit 213 includes a detection unit 2131, a calculation unit 2132, an acquisition unit 2133, a storage unit 2134, and a matching unit 2138. Note that the storage unit 2134 may be disposed on the outside of the subject re-tracking unit 213.

The detection unit 2131 is an example of the detection unit 11 described above. The detection unit 2131 detects subject appearance data including an appearing subject and subject disappearance data including a disappearing subject from subject data that are input to the subject re-tracking unit 213 and include positions of a plurality of subjects.

When a subject enters an angle of view of the video delivery device 101 acquiring video data, the subject becomes included (appears) in the video data. The detection unit 2131, referring to the subject tracking result 50, determines whether or not a subject included in a frame is a subject that newly appears in the video data, with respect to each of the records (subject data) included in the subject tracking result 50. The detection unit 2131, for example, stores tracking numbers 56 in frames having been processed in the past and confirms whether or not a tracking number 56 included in each record to be determined in the subject tracking result 50 coincides with any of the past tracking numbers 56. When a tracking number 56 included in a record to be determined does not coincide with any of the past tracking numbers 56, the detection unit 2131 determines that a subject associated with the record to be determined is a subject that newly appears in the video data. On the other hand, when a tracking number 56 included in a record to be determined coincides with one of the past tracking numbers 56, the detection unit 2131 determines that a subject associated with the record to be determined is not a subject that newly appears in the video data.

In this way, the detection unit 2131 detects, from a plurality of pieces of subject data, subject appearance data including information representing a position of a subject in a frame in which the subject is first included (appeared) on the time axis. For example, the detection unit 2131 may assign a flag (appearance flag) indicating data detected to be subject appearance data to a record having such data among the respective records in the subject tracking result 50. This flag indicates that a record to which an appearance flag with a value of "1" is assigned is subject appearance data, that is, a subject associated with the record is a subject that newly appears. On the other hand, this flag indicates that a record to which an appearance flag with a value of "0" is assigned or a record to which no appearance flag is assigned is not subject appearance data, that is, a subject associated with the record is not a subject that newly appears. Hereinafter, a subject that newly appears in the video data is simply referred to as an "appearing subject".

When a subject present in the angle of view of the video delivery device 101, which acquires the video data, moves out of the angle of view, the subject becomes not included in the video data (the subject disappears from the video data). The detection unit 2131, referring to the subject tracking result 50, with respect to each record included in the subject tracking result 50, confirms whether or not a tracking number 56 included in the record to be determined coincides with any of tracking numbers 56 included in records associated with frames positioned later than the frame associated with the record to be determined on the time axis. When a tracking number 56 included in the record to be determined coincides with one of tracking numbers 56 included in records associated with frames positioned later than the frame associated with the record to be determined on the time axis, the detection unit 2131 determines that a subject associated with the record to be determined had not disappeared. On the other hand, when a tracking number 56 included in the record to be determined does not coincide with any of tracking numbers 56 included in records associated with frames positioned later than the frame associated with the record to be determined on the time axis, the detection unit 2131 determines that a subject associated with the record to be determined disappears.

In this way, the detection unit 2131 detects, from a plurality of pieces of subject data, subject disappearance data including information representing a position of a subject in a frame in which the subject is last included on the time axis (the subject disappears from the next frame onward). For example, the detection unit 2131 may assign a flag (disappearance flag) indicating data detected to be subject disappearance data to a record having such data among the respective records in the subject tracking result 50. This flag indicates that a record to which a disappearance flag with a value of "1" is assigned is subject disappearance data, that is, a subject associated with the record is a subject that disappears from the next frame onward. On the other hand, this flag indicates that a record to which a disappearance flag with a value of "0" is assigned or a record to which no disappearance flag is assigned is not subject disappearance data, that is, a subject associated with the record is not a subject that disappears. Hereinafter, when a subject associated with a record disappears from the frame succeeding the frame associated with the record onward, the subject included in the frame associated with the record is referred to as a "disappearing subject".

The subject detection unit 2131 outputs subject detection data 70 including subject appearance data and subject disappearance data. FIG. 7 is a diagram illustrating an example of the subject detection data 70. In the subject detection data 70, an appearance flag 71 that indicates whether or not an associated subject is an appearing subject and a disappearance flag 72 that indicates whether or not an associated subject is a subject that disappears from the next frame onward are associated with each record in the subject tracking result 50.

As illustrated in FIG. 7, for example, the subject with the subject number "101-1" is an appearing subject because the appearance flag is "1". The subject with the subject number "102-1" is the same subject as the subject with the subject number "101-1" because the subject with the subject number "102-1" has the same tracking number as the subject with the subject number "101-1". The subject with the subject number "102-1" is a subject that disappears from frames positioned temporally later than the frame with the frame number "102" because the disappearance flag is "1".

The detection unit 2131 outputs the subject detection data 70 as described above to the calculation unit 2132. Note that the appearance flag 71 and the disappearance flag 72 may be represented by codes other than "0" and "1". The appearance flag 71 may be a flag of any other type as long as the flag indicates whether or not an associated subject is an appearing subject. The disappearance flag 72 may be a flag of any other type as long as the flag indicates whether or not an associated subject is a disappearing subject.

Note that, although, in each record in the subject detection data 70 illustrated in FIG. 7, only either the appearance flag 71 or the disappearance flag 72 is "1", both the appearance flag 71 and the disappearance flag 72 may be "0" or "1". A subject both the appearance flag 71 and the disappearance flag 72 of which are "0" is a subject included in both a temporally earlier frame and a temporally later frame than the frame including the subject. A subject both the appearance flag 71 and the disappearance flag 72 of which are "1" is an appearing subject and a disappearing subject at the same time.

The calculation unit 2132 is an example of the calculation unit 12 described above. The calculation unit 2132 calculates, based on subject appearance data and subject disappearance data detected by the detection unit 2131 and an appearance position distribution 2135 and disappearance position distribution 2136 of subjects that are learned in advance, appearance validity of the subject appearance data and disappearance validity of the subject disappearance data.

The appearance position distribution 2135 and disappearance position distribution 2136 of subjects that are learned in advance are stored in the storage unit 2134, as illustrated in FIG. 6. Note that the appearance position distribution 2135 and the disappearance position distribution 2136 may be respectively stored in different storage units 2134.

The appearance position distribution 2135 and the disappearance position distribution 2136 will now be described with reference to FIGS. 8 and 9, respectively. The appearance position distribution 2135 represents a distribution of positions of subjects in frames in which the subjects newly appear in video data. The appearance position distribution 2135 is data obtained by calculating, with respect to each position in frames, the total number of subjects that appear at the position and is data obtained through learning using past subject data. As illustrated in FIG. 8, the appearance position distribution 2135 includes region numbers 81, x-coordinate ranges 82, y-coordinate ranges 83, appearance counts 84, and a total appearance count 85. Note that FIG. 8 is an example of the appearance position distribution 2135 and the appearance position distribution 2135 may include information other than the information illustrated in FIG. 8.

It is assumed that, in the example in FIG. 8, an image of one frame contains 640×480 pixels. It is also assumed that a point at the top left corner, the horizontal direction, and the vertical direction of the image are the origin, the x-axis, and the y-axis, respectively. The appearance position distribution 2135 is a distribution in which, in the case where the whole region of the image is partitioned into a mesh of 80×80 pixel regions, the number of appearances with respect to each region and the total number of appearances over the whole region are recorded by performing learning using past subject data.

Each region number 81 is a number for identifying one of the partitioned regions. Although, in the example in FIG. 8, it is assumed that the region numbers 81 are numbers of the partitioned regions numbered in ascending order beginning from 1 in the rightward direction from the top left corner of the whole region, any numbers may be used as the region numbers 81 as long as being capable of identifying each of the partitioned regions. Each x-coordinate range 82 and each y-coordinate range 83 indicate a range of the x-coordinate and range of the y-coordinate of a region identified by a region number 81, respectively. Each appearance count 84 is the number of appearances of subjects in the associated region. The total appearance count 85 is the sum of the appearance counts 84. As illustrated in FIG. 8, in the present example embodiment, it is indicated that the numbers of appearances of subjects in regions with region numbers "6" and "7" are 40 and 50, respectively. It is also indicated that the numbers of appearances of subjects in regions with region numbers "21" and "22" are 4 and 6, respectively. It is assumed that no subject has appeared in the other regions. Therefore, the total appearance count 85 becomes "100", which is the sum of the respective appearance counts 84.

The appearance position distribution 2135 may be a result of performing learning using a predetermined number of frames or a result of performing learning until the total appearance count 85 exceeds a predetermined threshold value.

The disappearance position distribution 2136 represents a distribution of positions of subjects in frames in which the subjects are last included before the subjects disappear from video data. The disappearance position distribution 2136 is data obtained by calculating, with respect to each position in frames, the total number of subjects that disappear at the position and is data obtained through learning using past subject data. As illustrated in FIG. 9, the disappearance position distribution 2136 includes region numbers 91, x-coordinate ranges 92, y-coordinate ranges 93, disappearance counts 94, and a total disappearance count 95. Note that FIG. 9 is an example of the disappearance position distribution 2136 and the disappearance position distribution 2136 may include information other than the information illustrated in FIG. 9.

In FIG. 9, as with FIG. 8, the disappearance position distribution 2136 in the case where a point at the top left corner, the horizontal direction, and the vertical direction of an image having 640×480 pixels are assumed to be the origin, the x-axis, and the y-axis, respectively and the whole region of the image is partitioned into a mesh of 80×80 pixel regions is illustrated. The disappearance position distribution 2136 is a distribution in which the number of disappearances with respect to each region and the total number of disappearances over the whole region in the above-described case are recorded by performing learning using past subject data.

The region numbers 91, the x-coordinate ranges 92, and the y-coordinate ranges 93 are similar to the region numbers 81, the x-coordinate ranges 82, and the y-coordinate ranges 83, respectively. Each disappearance count 94 is the number of times that, in the cases where subjects disappear from frames that succeed the frames associated with the subjects, the subjects are last included in the region associated with the disappearance count 94 in the frames associated with the subjects. The total disappearance count 95 is the sum of the disappearance counts 94. The disappearance position distribution 2136 in FIG. 9 indicates that the number of times subjects disappeared after having been included in a region with a region number "22", the number of times subjects disappeared after having been included in a region with a region number "25", and the number of times subjects disappeared after having been included in a region with a region number "46" are 5, 50, and 45, respectively. It is assumed that no subject has disappeared in the other regions. Therefore, the total disappearance count 95 becomes "100", which is the sum of the respective disappearance counts 94.

The disappearance position distribution 2136 may be a result of performing learning using a predetermined number of frames or a result of performing learning until the total disappearance count 95 exceeds a predetermined threshold value.

In the present example embodiment, it is assumed that the appearance position distribution 2135 and the disappearance position distribution 2136 are updated after appearance validity and disappearance validity are calculated by calculation unit 2132.

The calculation unit 2132 calculates appearance validity of subject appearance data and disappearance validity of subject disappearance data, based on the appearance position distribution 2135 as illustrated in FIG. 8, the disappearance position distribution 2136 as illustrated in FIG. 9, and the subject detection data 70.

The appearance validity is a numerical value representing a degree to which a first-time appearance in the video at a position in a frame by a subject is different from the past distribution at the position. The appearance validity is, for example, represented by a numerical value from 0 to 1. An appearance validity value close to 1 indicates that the validity is low that the associated subject is first included (appears) in the video data at the position included in the subject appearance data. That is, an appearance validity value close to 1 indicates that the possibility is high that the subject to which an appearance flag is assigned is not a subject that appears in the associated frame but a subject that was included in a frame in the past. An appearance validity value close to 1 indicates that the possibility is high that the subject to which an appearance flag is assigned is a subject the tracking of which was interrupted.

An example of a calculation method of appearance validity will now be described with reference to FIGS. 7 and 8. The subject with the subject number "101-1" illustrated in FIG. 7 has a tracking number "1" and an appearance flag "1". As described above, a subject the appearance flag of which is "1" is an appearing subject. The calculation unit 2132, referring to the appearance position distribution 2135, acquires an appearance count 84 with respect to a position at which a subject appears. The subject area 44 of the subject with the subject number "101-1" is an area having central coordinates of (450, 40). The region specified by a region number 81 in which the central coordinates are included is the region with the region number "6", the x-coordinate range 82 and the y-coordinate range 83 of which are "400≤x<480" and "0≤y<80", respectively. Since the appearance count 84 of the region with the region number "6" is "40" as illustrated in FIG. 8, the calculation unit 2132 acquires an appearance count of "40" from the appearance position distribution 2135. The calculation unit 2132 also acquires the total appearance count 85 from the appearance position distribution 2135. Since the total appearance count 85 is "100" as illustrated in FIG. 8, the calculation unit 2132 acquires a total appearance count of "100" from the appearance position distribution 2135.

The calculation unit 2132 calculates appearance validity, using the formula (1) below.

$$\text{Appearance validity}=1-(\text{appearance count}/\text{total appearance count}) \quad (1)$$

Substituting the acquired appearance count of "40" and total appearance count of "100" into the above formula (1) results in the following equation.

$$\text{Appearance validity}=1-(40/100)=0.6$$

By this equation, an appearance validity of "0.6" is calculated for the subject with the subject number "101-1".

In a similar manner, the calculation unit 2132 calculates appearance validity for records the appearance flags 71 of which are "1". For records the appearance flags 71 of which are "0", the calculation unit 2132 does not calculate appearance validity or calculates appearance validity as a value of "0".

Note that the calculation method of appearance validity is not limited to the above-described method and another method or table that causes a high appearance validity value to be calculated when the past appearance count 84 is small may be used.

The disappearance validity is a numerical value representing a degree to which a presence at a position in a frame by a subject immediately before the subject disappeared from the video is different from past distribution at the position. The disappearance validity is, for example, represented by a numerical value from 0 to 1. A disappearance validity value close to 1 indicates that the validity is low that the associated subject was last included in the video data at the position included in the subject disappearance data (disappeared after the frame). That is, a disappearance validity value close to 1 indicates that the possibility is high that the subject to which a disappearance flag is assigned is not a subject that disappears in the associated frame but a subject that is also included in a frame after the associated frame. A disappearance validity value close to 1 indicates that the possibility is high that the subject to which a disappearance flag is assigned is a subject the tracking of which was interrupted.

An example of a calculation method of disappearance validity will now be described with reference to FIGS. 7 and 9. The subject with the subject number "102-1" illustrated in FIG. 7 has the tracking number "1" and a disappearance flag "1". As described above, a subject the disappearance flag of which is "1" is a disappearing subject. The calculation unit 2132, referring to the disappearance position distribution 2136, acquires a disappearance count 94 with respect to a position at which a subject disappears. The subject area 44 of the subject with the subject number "102-1" is an area having central coordinates of (450, 200). The region specified by a region number 91 in which the central coordinates are included is the region with the region number "22", the x-coordinate range 92 and the y-coordinate range 93 of which are "400≤x<480" and "160≤y<240", respectively. Since the disappearance count 94 of the region with the region number "22" is "5" as illustrated in FIG. 9, the calculation unit 2132 acquires a disappearance count of "5" from the disappearance position distribution 2136. The calculation unit 2132 also acquires the total disappearance count 95 from the disappearance position distribution 2136. Since the total disappearance count 95 is "100" as illustrated FIG. 9, the calculation unit 2132 acquires a total disappearance count of "100" from the disappearance position distribution 2136.

The calculation unit 2132 calculates disappearance validity, using the formula (2) below.

$$\text{Disappearance validity}=1-(\text{disappearance count}/\text{total disappearance count}) \quad (2)$$

Substituting the acquired disappearance count of "5" and total disappearance count of "100" into the above formula (2) results in the following equation.

$$\text{Disappearance validity}=1-(5/100)=0.95$$

By this equation, a disappearance validity of "0.95" is calculated for the subject with the subject number "102-1".

In a similar manner, the calculation unit 2132 calculates disappearance validity for records the disappearance flags 72 of which are "1". For records the disappearance flags 72 of which are "0", the calculation unit 2132 does not calculate disappearance validity or calculates disappearance validity as a value of "0".

Note that the calculation method of disappearance validity is not limited to the above-described method and another method or table that causes a high disappearance validity value to be calculated when the past disappearance count 94 is small may be used.

The calculation unit 2132 associates the calculated appearance validity and disappearance validity with the respective records in the subject detection data 70 and outputs result data as a validity calculation result 73.

In FIG. 10, an example of the validity calculation result 73 is illustrated. As illustrated in FIG. 10, the validity calculation result 73 includes appearance validity 74 and disappearance validity 75 in addition to the respective columns in the subject detection data 70. An entry "none" in the column of the appearance validity 74 indicates that the calculation unit 2132 has not calculated appearance validity for the record, that is, the record is not a record the appearance validity of which is to be calculated. Similarly, an entry "none" in the column of the disappearance validity 75 indicates that the calculation unit 2132 has not calculated disappearance validity for the record, that is, the record is not a record the disappearance validity of which is to be calculated.

Since the appearance validity 74 and the disappearance validity 75 represent a degree of possibility that the subject is a subject the tracking of which is interrupted, the appearance validity 74 and the disappearance validity 75 are also collectively referred to as a tracking interruption score.

The calculation unit 2132 further updates the appearance position distribution 2135. The calculation unit 2132 increments the appearance count 84 of the region in the appearance position distribution 2135 corresponding to the subject area 44 of each subject the appearance flag 71 of which is "1" and the total appearance count 85. For example, in the case of the subject with the subject number "101-1", the calculation unit 2132 increments the appearance count 84 of the region with the region number "6" and the total appearance count 85.

The calculation unit 2132 also updates the disappearance position distribution 2136. The calculation unit 2132 increments the disappearance count 94 of the region in the disappearance position distribution 2136 corresponding to the subject area 44 of each subject the disappearance flag 72 of which is "1" and the total disappearance count 95. For example, in the case of the subject with the subject number "102-1", the calculation unit 2132 increments the disappearance count 94 of the region with the region number "22" and the total disappearance count 95.

The update of the appearance position distribution 2135 and the disappearance position distribution 2136 by the calculation unit 2132 enables the calculation unit 2132 to calculate the appearance validity 74 and the disappearance validity 75 of subjects included in frames that are subsequently processed with high accuracy.

The acquisition unit 2133 is an example of the acquisition unit 13. Based on the appearance validity 74 and the disappearance validity 75 calculated by the calculation unit 2132, the acquisition unit 2133 acquires a combination(s) of subject appearance data and subject disappearance data detected by the detection unit 2131 that satisfy(ies) a predetermined condition, the number of the combinations being less than or equal to a threshold value. The acquisition unit 2133 outputs an acquisition result to the matching unit 2138.

Specifically, the acquisition unit 2133 receives the validity calculation result 73 from the calculation unit 2132. The acquisition unit 2133 lists combinations of subject appearance data the appearance flag 71 of which is "1" and subject disappearance data the disappearance flag 72 of which is "1" that are included in the validity calculation result 73.

The combinations will be described with reference to an example of a combination result 111. FIG. 11 is a diagram illustrating an example of the combination result 111. As illustrated in FIG. 11, the combination result 111 includes combination numbers 112, disappearing subject numbers 113, appearing subject numbers 114, time consistency 115, identity scores 116, and matching target information 117.

Each disappearing subject number 113 is the subject number 43 of a subject the disappearance flag 72 of which is "1". Each appearing subject number 114 is the subject number 43 of a subject the appearance flag 71 of which is "1". As illustrated in FIG. 10, subjects the appearance flags 71 of which are "1" are five subjects the subject numbers 43 of which are "101-1", "101-2", "103-1", "103-2", and "104-3". Subjects the disappearance flags 72 of which are "1" are four subjects the subject numbers 43 of which are "102-1", "102-2", "104-1", and "104-2". Therefore, 20 (=4×5) combinations of the subject disappearance data of a subject having disappeared and the subject appearance data of a subject having appeared can be generated, and, when the combinations are listed, 20 combinations illustrated in FIG. 11 are obtained. As described above, the acquisition unit 2133 lists combinations of a disappearing subject number 113 and an appearing subject number 114 and assigns each combination a combination number 112 for identifying the combination. This operation produces the combination numbers 112, the disappearing subject numbers 113, and the appearing subject numbers 114 in the combination result 111.

The acquisition unit 2133 determines, with respect to each combination of subjects, whether or not a time at which the disappearing subject disappears and a time at which the appearing subject appears have consistency with each other. When a case where tracking of an identical subject is interrupted because of hiding and the subject is recognized as two different subjects is now considered, the two subjects do not exist in the same frame at the same time and, after one of the subjects has disappeared, the other of the subjects appears. That is, only when a time at which an appearing subject appears is later than a time at which a disappearing subject disappears, the two subjects have a possibility to be an identical subject. The acquisition unit 2133 determines, with respect to each of the listed combinations, that times in the combination have consistency with each other when a time at which the appearing subject appears is later than a time at which the disappearing subject disappears.

Referring to FIGS. 10 and 11, a combination the combination number 112 of which is "1" is a combination of a subject the disappearing subject number 113 of which is "102-1" and a subject the appearing subject number 114 of which is "101-1". The frame time 42 associated with the subject the disappearing subject number 113 of which is "102-1" is "10 hr 15 min 21 sec". Meanwhile, the frame time 42 associated with the subject the appearing subject number 114 of which is "101-1" is "10 hr 15 min 20 sec". That is, there is no possibility that the two subjects are an identical subject and the times have no consistency with each other because the time at which the appearing subject appeared is earlier than the time at which the disappearing subject disappeared. In this way, the acquisition unit 2133 performs determination of time consistency with respect to each combination.

The acquisition unit 2133 associates, as time consistency 115 in FIG. 11, a result of the consistency determination with a combination number 112. Entries "inconsistent" and "consistent" in the column of the time consistency 115 indicate that a time at which an appearing subject appears is not later than a time at which a disappearing subject disappears and that a time at which an appearing subject appears is later than a time at which a disappearing subject disappears, respectively. That is, the time consistency 115 illustrated in FIG. 11 indicates that there is no inconsistency between a disappearance time and an appearance time.

Further, the acquisition unit 2133 calculates, with respect to each combination that has time consistency, an identity score that represents a degree of possibility that the subjects in the combination are identical. The acquisition unit 2133 calculates an identity score with respect to each of combinations the time consistency 115 of which is "consistent". The calculation unit 2133 calculates an identity score, using the formula (3) below.

Identity score=disappearance validity of disappearing subject×appearance validity of appearing subject (3)

Referring to FIG. 11, combinations the time consistency 115 of which is "consistent" include, for example, a combination the combination number 112 of which is "3". The combination the combination number 112 of which is "3" is a combination of a subject the disappearing subject number 113 of which is "102-1" and a subject the appearing subject number 114 of which is "103-1". Referring to FIG. 10, the disappearance validity 75 associated with the subject the disappearing subject number 113 of which is "102-1" is "0.95". The appearance validity 74 associated with the subject the appearing subject number 114 of which is "103-1" is "0.94". On this occasion, the identity score is calculated using the formula (3) as described below.

Identity score=0.95×0.94=0.893

The acquisition unit 2133 also calculates, with respect to other combinations the time consistency 115 of which is "consistent", identity scores in a similar manner. The acquisition unit 2133 associates calculated identity scores with the respective combinations. In the identity scores 116 in FIG. 11, identity scores 116 calculated in this way are stored. As illustrated in FIG. 11, since the number of combinations the time consistency 115 of which is "consistent" is six, the acquisition unit 2133 calculates identity scores 116 with respect to the six combinations.

Note that, although, with a combination for which the identity score 116 is not calculated, that is, a combination the time consistency 115 of which is "inconsistent", a word "none" is associated as the identity score 116, any information indicating that the identity score 116 is not calculated may be associated with such a combination instead of "none".

As described above, the identity score 116 is a value calculated using appearance validity 74 and disappearance validity 75 and indicates that, the higher is the value, the higher becomes the possibility that a disappearing subject and an appearing subject are identical.

Note that, for calculation of an identity score 116, without being limited to the above-described formula (3), another formula or table that causes a high identity score 116 to be calculated when the disappearance validity 75 of a disappearing subject and the appearance validity 74 of an appearing subject are high may be used.

The acquisition unit 2133 acquires, based on the calculated identity scores 116, a combination(s) satisfying a predetermined condition as a matching target(s) out of the combinations included in the validity calculation result 73. The acquisition unit 2133, referring to load condition information 2137 stored in the storage unit 2134, acquires a combination(s) satisfying a condition that the load condition information 2137 represents. The predetermined condition is, for example, a condition requiring the number of times matching processing is performed to be less than or equal to a predetermined number, a condition requiring the identity score to be greater than or equal to a predetermined value, or the like. The matching processing is processing performed targeting a subject specified by subject disappearance data and a subject specified by subject appearance data that are included in a combination. The matching processing performed with respect to one combination is counted as one time. Thus, for example, performing matching processing four times indicates that the matching processing is performed with respect to each of four combinations.

Figure 12:
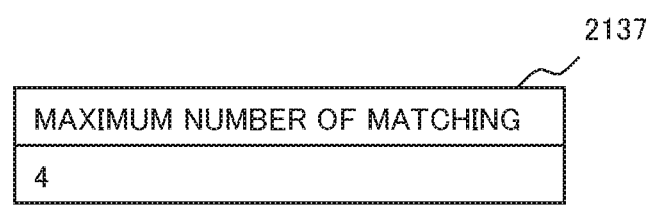
FIG. 12 is a diagram illustrating an example of load condition information.

In FIG. 12, an example of the load condition information 2137 is illustrated. In the present example embodiment, it is assumed that the predetermined condition is the number of times matching processing is performed. In the load condition information 2137, a numerical value of "4", which is a value of the maximum number of matching, is stored as a predetermined condition. Note that the maximum number of matching may be the number of times matching processing is performed within a predetermined time width. In this case, the predetermined time width may be determined in advance or may be a value that varies depending on types of video data.

Note that the load condition information 2137 may be stored in a storage unit different from the storage unit in which the appearance position distribution 2135 and the disappearance position distribution 2136 are stored. The load condition information 2137 may be appropriately changed depending on a load on the effective data extraction device 201 at a time point.

The acquisition unit 2133, referring to the load condition information 2137, acquires combinations included in the validity calculation result 73 in such a way that the number of times matching processing is performed is not more than four. On this occasion, the acquisition unit 2133, referring to the identity scores 116, acquires combinations. First, the acquisition unit 2133 acquires combinations the identity scores 116 of which are not "none" as matching target candidates. That is, the acquisition unit 2133 does not categorize a combination the identity score 116 of which is "none" as a matching target candidate. A combination the identity score 116 of which is "none", as described above, is a combination that does not have time consistency. Therefore, the acquisition unit 2133 excludes a combination that does not have time consistency from matching target candidates. This operation enables the acquisition unit 2133 to set six combinations as matching target candidates out of 20 combinations illustrated in FIG. 11.

The matching target information 117 in FIG. 11 is information representing whether or not each combination is a matching target. The acquisition unit 2133 associates, with each combination the identity score 116 of which is "none", a code "not target" that indicates that the combination is not a matching target, as the matching target information 117.

Referring to FIG. 11, since there are six combinations the identity scores 116 of which are not "none", the acquisition unit 2133 acquires four combinations as matching target candidates out of the six matching target candidates.

For comparison, a case where the acquisition unit 2133, without limiting the number of matching targets, selects all combinations of subjects that are to be matched with each other is now considered. Referring to FIG. 11, combinations of subjects in each of which a time at which the disappearing subject disappeared and a time at which the appearing subject appeared are consistent with each other are combinations the combination numbers 112 of which are "3", "4", "5", "8", "9", and "10". Therefore, when the matching processing is performed on the respective ones of the combinations, the number of times the matching is performed becomes six. When this case is compared with a case where the number of matching targets is limited, a load required for matching in this case becomes 1.5 (=6/4) times a load in the latter case.

That is, limiting the number of combinations of subjects to be matched with each other in such a way as to satisfy a condition represented by the load condition information 2137 as done by the acquisition unit 2133 enables a processing load required for processing of extracting effective data using tracking of the subjects to be reduced.

Note that it is preferable that the acquisition unit 2133 acquire combinations in descending order of the identity scores 116. The acquisition unit 2133 prioritizes combinations included in the combination result 111 in descending order of the identity scores 116 and, in the order of priorities, acquires subject disappearance data and subject appearance data associated with combinations satisfying a condition that the load condition information 2137 represents as matching targets.

In the example in FIG. 11, when the respective combinations are rearranged in descending order of the identity scores 116, the combinations the combination numbers 112 of which are "4", "9", "3", "8", "5", and "10" are sequenced in this order. Note that, although, when combinations have the same identity scores 116, the combinations were rearranged in such a way that a combination having a smaller combination number 112 is arranged first in the above rearrangement, the combinations may be rearranged in such a way that a combination having a larger combination number 112 is arranged first. Since, in the load condition information 2137, a condition requiring the maximum number of matching to be four is specified, the acquisition unit 2133 selects four combinations in descending order of the identity scores 116. That is, the acquisition unit 2133 selects the combinations the combination numbers 112 of which are "4", "9", "3", and "8".

It is preferable that, as described above, the acquisition unit 2133 acquire combinations in descending order of the identity scores 116, that is, in descending order of the probability that a subject included in the subject disappearance data and a subject included in the subject appearance data are an identical subject.

For example, in the case the acquisition unit 2133 acquired four combinations simply in ascending order of the combination numbers 112 instead of in descending order of the identity scores 116, the acquisition unit 2133 would acquire the combinations the combination numbers 112 of which are "3", "4", "5", and "8". Since, in this case, the number of combinations is the same, a load required for matching processing of transitions is the same. However, in this case, the combination the combination number 112 of which is "9", which is a combination that has a high probability that a subject included in the subject disappearance data and a subject included in the subject appearance data are an identical subject, is not selected. Thus, even when re-tracking processing is performed using these subject data, the probability that the tracking processing fails increases.

However, the acquisition unit 2133 acquiring combinations in descending order of the identity scores 116 enables the probability that re-tracking of subjects succeeds to be increased. Therefore, it is possible to further reduce the amount of data that the effective data extraction device 201 outputs.

The acquisition unit 2133 associates, with each selected combination, a code "target" that indicates that the combination is a matching target, as the matching target information 117. The acquisition unit 2133 also associates, with each combination that is not selected as a matching target, the code "not target", which indicates that the combination is not a matching target, as the matching target information 117.

Accordingly, the acquisition unit 2133 is able to obtain the combination result 111 as illustrated in FIG. 11. The acquisition unit 2133 supplies the matching unit 2138 with, out of the combination result 111, the subject disappearance data and the subject appearance data of each combination the matching target information 117 of which is "target" as an acquisition result.

The matching unit 2138 matches a subject included in the subject disappearance data and a subject included in the subject appearance data that are supplied from the acquisition unit 2133 with each other. Through this operation, the matching unit 2138 determines whether or not the subjects are identical to each other. The method of matching that the matching unit 2138 performs is not limited to a specific method, and the matching may be performed employing an arbitrary method. The matching unit 2138 generates and outputs a subject re-tracking result 131 in such a way that subjects that are identical to each other have an identical re-tracking number.

FIG. 13 is a diagram illustrating an example of the subject re-tracking result 131. The subject re-tracking result 131 is constituted by including re-tracking numbers 132 in addition to the subject tracking result 50. It is assumed that, as a result of the matching, the subject the disappearing subject number 113 of which is "102-1" and the subject the appearing subject number 114 of which is "103-2", included in the combination the combination number 112 of which is "4", are determined to be an identical subject. It is also assumed that the subject the disappearing subject number 113 of which is "102-2" and the subject the appearing subject number 114 of which is "103-2", included in the combination the combination number 112 of which is "9", are determined to be an identical subject.

The matching unit 2138 associates a number "1" that is the tracking number 56 of the subject the subject number 43 of which is "102-1" in the subject tracking result 50 with the subject the subject number 43 of which is "103-1" as a re-tracking number 132 thereof. The number "1" is also associated with the re-tracking number 132 of the subject the subject number 43 of which is "104-1" and that has the same tracking number 56 as the tracking number 56 of the subject the subject number 43 of which is "103-1". Similarly, the matching unit 2138 associates a number "2" that is the tracking number 56 of the subject the subject number 43 of which is "102-2" in the subject tracking result 50 with the subjects the subject numbers 43 of which are "103-2" and "104-2" as re-tracking numbers 132 thereof.

In this way, the matching unit 2138 generates the subject re-tracking result 131 illustrated in FIG. 13 and outputs the generated subject re-tracking result 131 to the subject selection unit 214.

Returning to FIG. 3, the subject selection unit 214 will be described. The subject selection unit 214 of the effective data extraction device 201 receives the subject re-tracking result 131 from the subject re-tracking unit 213 and, out of subjects detected during a predetermined time width, selects subjects the subject quality scores 45 of which are higher than a predetermined threshold value or selects a predetermined number of subjects in descending order of the subject quality scores 45 with respect to each re-tracking number 132. The subject selection unit 214 outputs the subject data of the selected subjects as a subject selection result. Constituent elements of the subject selection result are similar to the constituent elements of the above-described subject re-tracking result 131.

For example, the subject data of subjects the re-tracking numbers of which are "1" illustrated in FIG. 13 are records the subject numbers 43 of which are "101-1", "102-1", "103-1", and "104-1". When the number of pieces of the subject data that the subject selection unit 214 selects is a predetermined number (for example, three) in descending order of the subject quality scores 45, the subject selection unit 214 outputs the records the subject numbers 43 of which are "102-1", "103-1", and "104-1", which have high subject quality scores 45, as a subject selection result.

This configuration enables the subject selection unit 214 to output data effective for analysis out of the video data. Further, selection of subject data by the subject selection unit 214, based on the subject quality scores 45 enables data more appropriate for analysis to be output.

Note that, although, in FIG. 13, subject data are either subject appearance data or subject disappearance data, subject data may be a record both the appearance flag 71 and the disappearance flag 72 of which are "0", as described above. Even in this case, the subject selection unit 214 is able to output records the subject quality scores 45 of which are high based on the subject quality scores 45.

Next, with reference to FIGS. 14 to 19, a processing flow of the video monitoring system 100 according to the present example embodiment will be described.

Figure 14:
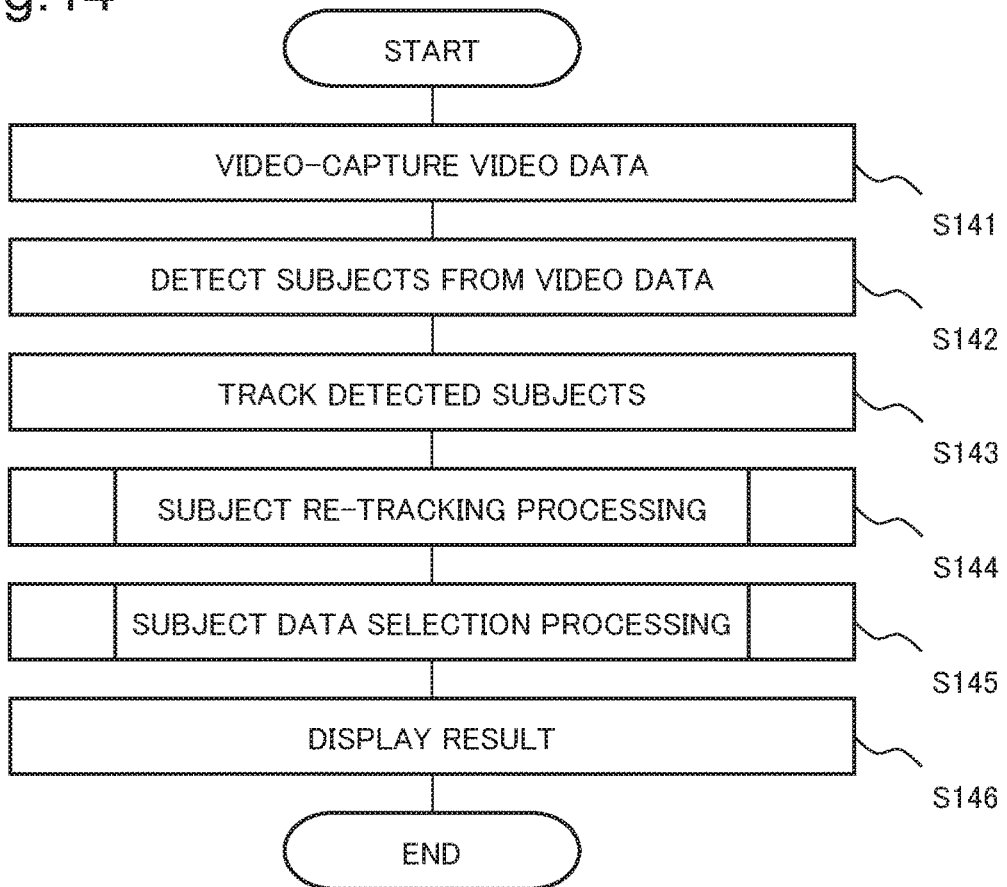
FIG. 14 is a flowchart illustrating an example of a processing flow of the video monitoring system according to the second example embodiment.

FIG. 14 is a flowchart illustrating an example of a flow of operation of the video monitoring system 100 according to the present example embodiment. As illustrated in FIG. 14, the video delivery device 101 video-captures video data (step S141). The video-captured video data are output to the effective data extraction device 201.

The subject detection unit 211 detects subjects included in the video data output from the video delivery device 101. Specifically, the subject detection unit 211 receives video data from the video delivery device 101, divides the received video data into frames, and detects one or a plurality of subjects with respect to each frame (step S142). The subject detection unit 211 outputs a subject detection result 40 as illustrated in, for example, FIG. 4 that is a detection result of subjects to the subject tracking unit 212.

Next, the subject tracking unit 212 tracks subjects by determining whether or not subjects included in the respective frames are identical subjects. Specifically, the subject tracking unit 212, referring to the subject areas 44 and the like in the subject detection result 40, determines whether or not subjects are identical among the frames. The subject tracking unit 212 outputs a subject tracking result 50 that includes tracking numbers associated with the subject detection result 40, based on results of the determination to the subject re-tracking unit 213 (step S143).

Next, the subject re-tracking unit 213 performs subject re-tracking processing (step S144). Specifically, the subject re-tracking unit 213 receives subject tracking results from the subject tracking unit 212 and calculates a degree of possibility that tracking was interrupted. The subject re-tracking unit 213 matches subjects having a high possibility that tracking thereof was interrupted with each other and thereby determines again whether or not the subjects are identical subjects. The subject re-tracking processing will be described in more detail later using different drawings. The subject re-tracking unit 213 outputs a subject re-tracking result 131 to the subject selection unit 214.

Next, the subject selection unit 214 performs, based on the subject re-tracking results 131, subject data selection processing of preferentially selecting subject data of subjects having high subject quality scores (step S145). The subject selection unit 214 outputs a result of the subject selection to the display device 301.

The display device 301 displays information of subjects selected by the subject selection unit 214 on a screen or the like. In this operation, the display device 301 may display a result of analysis performed on the subject data selected by the subject selection unit 214, such as displaying identifiers of subjects identified through feature extraction and matching of subjects. In addition, the display device 301 may perform secondary analysis on analyzed subject data and subsequently display a result of the secondary analysis (step S146). Information that the display device 301 displays is not limited to specific information, and any information obtainable from the subject data may be displayed.

Figure 15:
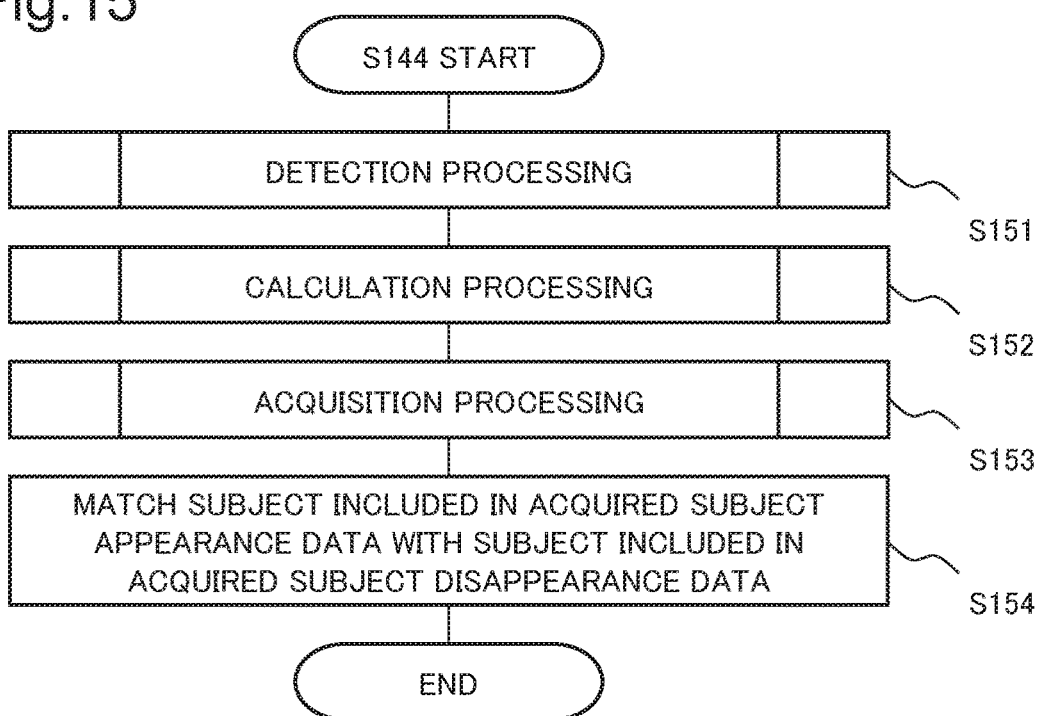
FIG. 15 is a flowchart illustrating an example of a flow of subject re-tracking processing in the second example embodiment.

Next, a flow of the above-described subject re-tracking processing in step S144 will be described with reference to FIG. 15. FIG. 15 is a flowchart illustrating an example of the flow of the subject re-tracking processing.

As illustrated in FIG. 15, the detection unit 2131 performs detection processing of detecting, from subject data, subject appearance data including an appearing subject and subject disappearance data including a disappearing subject (step S151). The detection unit 2131 outputs subject detection data 70 including the detected subject appearance data and subject disappearance data to the calculation unit 2132.

Next, based on the subject appearance data and the subject disappearance data detected by the detection unit 2131 and an appearance position distribution 2135 and disappearance position distribution 2136 of subjects that are learned in advance, the calculation unit 2132 performs calculation processing of calculating appearance validity of the subject appearance data and disappearance validity of the subject disappearance data (step S152). The calculation unit 2132 outputs a validity calculation result 73 including the calculated appearance validity and disappearance validity of the subject appearance data and the subject disappearance data, respectively, to the acquisition unit 2133.

Subsequently, based on the appearance validity and the disappearance validity calculated by the calculation unit 2132 in step S152, the acquisition unit 2133 performs acquisition processing of acquiring a combination(s) that satisfy(ies) a predetermined condition for subject appearance data and subject disappearance data detected by the detection unit 2131 in step S151 (step S153). The acquisition unit 2133 outputs an acquisition result, which is a combination(s) of acquired subject appearance data and subject disappearance data, to the matching unit 2138.

Next, the matching unit 2138 performs matching between a subject of subject appearance data and a subject of subject disappearance data (step S154). With this operation, the subject re-tracking unit 213 outputs a result obtained from the matching to the subject selection unit 214 as the subject re-tracking result 131.

Figure 16:
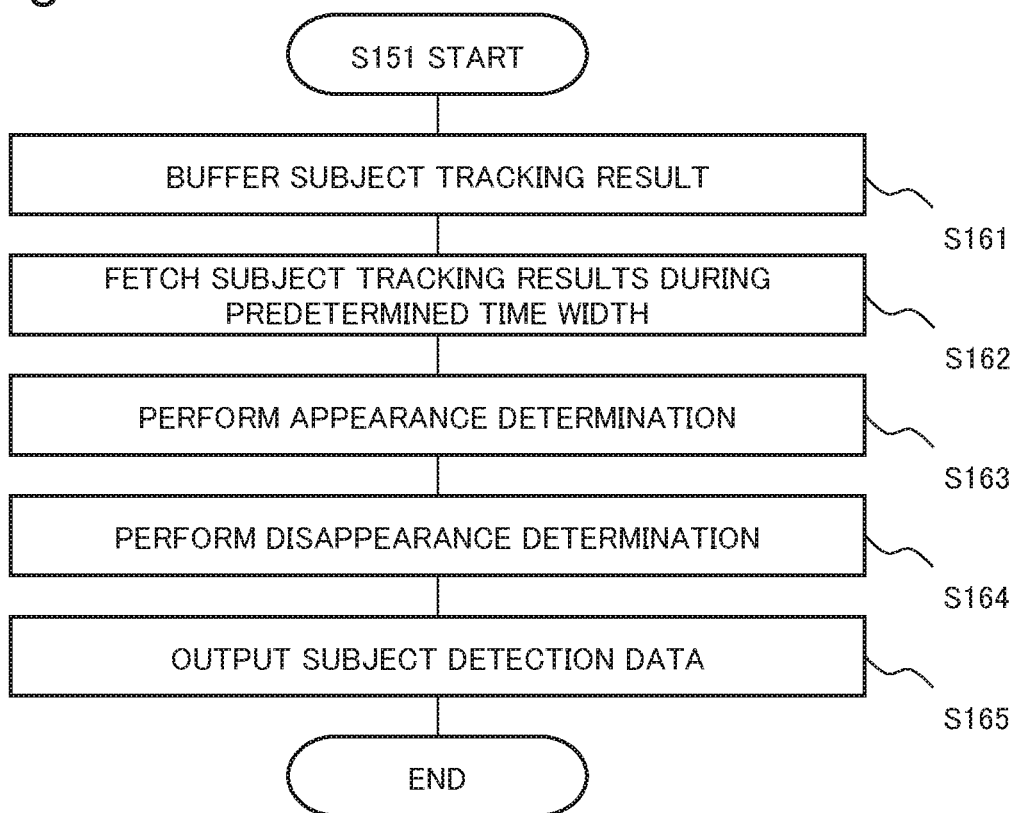
FIG. 16 is a flowchart illustrating an example of a flow of detection processing.

FIG. 16 is a flowchart illustrating an example of the flow of the detection processing in step S151 illustrated in FIG. 15. As illustrated in FIG. 16, the detection unit 2131 receives the subject tracking result 50 from the subject tracking unit 212 and buffers the received subject tracking result 50 in a buffer (step S161). Next, the detection unit 2131 fetches the subject tracking result 50 during a predetermined time width from the buffer (step S162). The predetermined time width is not limited to a specific period and can be appropriately altered depending on types and places of video data.

The detection unit 2131 determines, with respect to each record included in the fetched subject tracking result 50, whether or not a subject in the record is a subject that newly appears in the video data (performs appearance determination) (step S163). In addition, the detection unit 2131 determines, with respect to each record included in the subject tracking result 50 fetched in step S162, whether or not a subject in the record is a subject that disappeared from the video data (performs disappearance determination) (step S164).

The detection unit 2131 associates an appearance flag 71 that is a result of the appearance determination or a disappearance flag 72 that is a result of the disappearance determination with each record in the subject tracking result 50 and outputs a result of the association as the subject detection data 70 (step S165).

With this step, the detection processing by the detection unit 2131 is finished. Note that steps S163 and S164 may be performed at the same time or performed in the reverse order.

Figure 17:
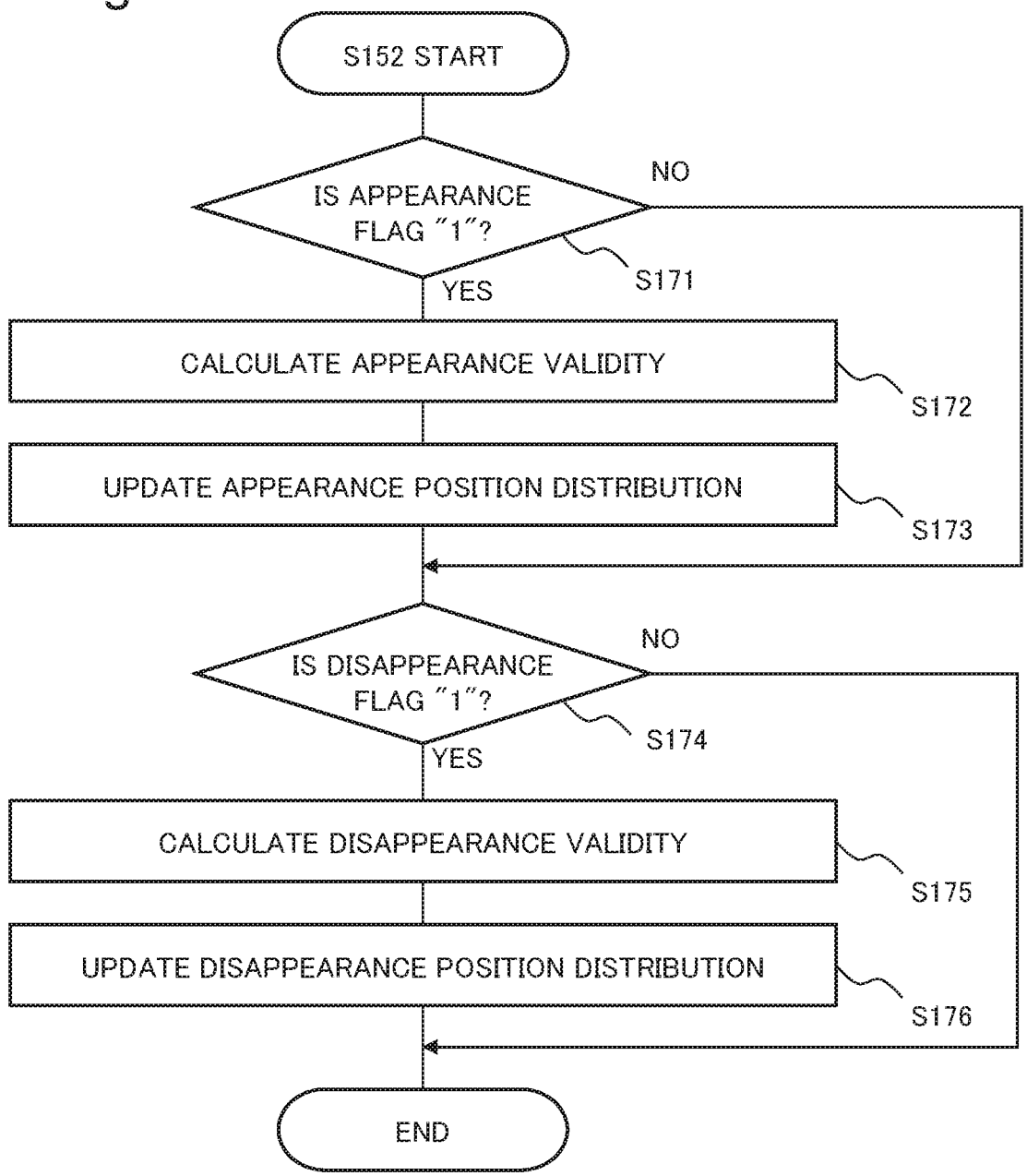
FIG. 17 is a flowchart illustrating an example of a flow of calculation processing.

FIG. 17 is a flowchart illustrating an example of the flow of the calculation processing in step S152 illustrated in FIG. 15. As illustrated in FIG. 17, the calculation unit 2132, for example, determines, with respect to each record included in the subject detection data 70 illustrated in FIG. 7, whether or not the appearance flag 71 is "1" (step S171). When the appearance flag 71 is not "1" (is "0") (NO in step S171), the process proceeds to step S174.

When the appearance flag 71 is "1" (YES in step S171), the calculation unit 2132 calculates appearance validity 74 (step S172). Next, the calculation unit 2132 updates the appearance position distribution 2135 (step S173).

Next, the calculation unit 2132, for example, determines, with respect to each record included in the subject detection data 70 illustrated in FIG. 7, whether or not the disappearance flag 72 is "1" (step S174). When the disappearance flag 72 is not "1" (is "0") (NO in step S174), the process is finished.

When the disappearance flag 72 is "1" (YES in step S174), the calculation unit 2132 calculates disappearance validity 75 (step S175). Next, the calculation unit 2132 updates the disappearance position distribution 2136 (step S176). Note that the processing in steps S174 to S176 may be performed before step S171 or performed at the same time as any of steps S171 to S173.

With this operation, the calculation unit 2132 outputs the validity calculation result 73 including the appearance validity 74 and the disappearance validity 75.

Figure 18:
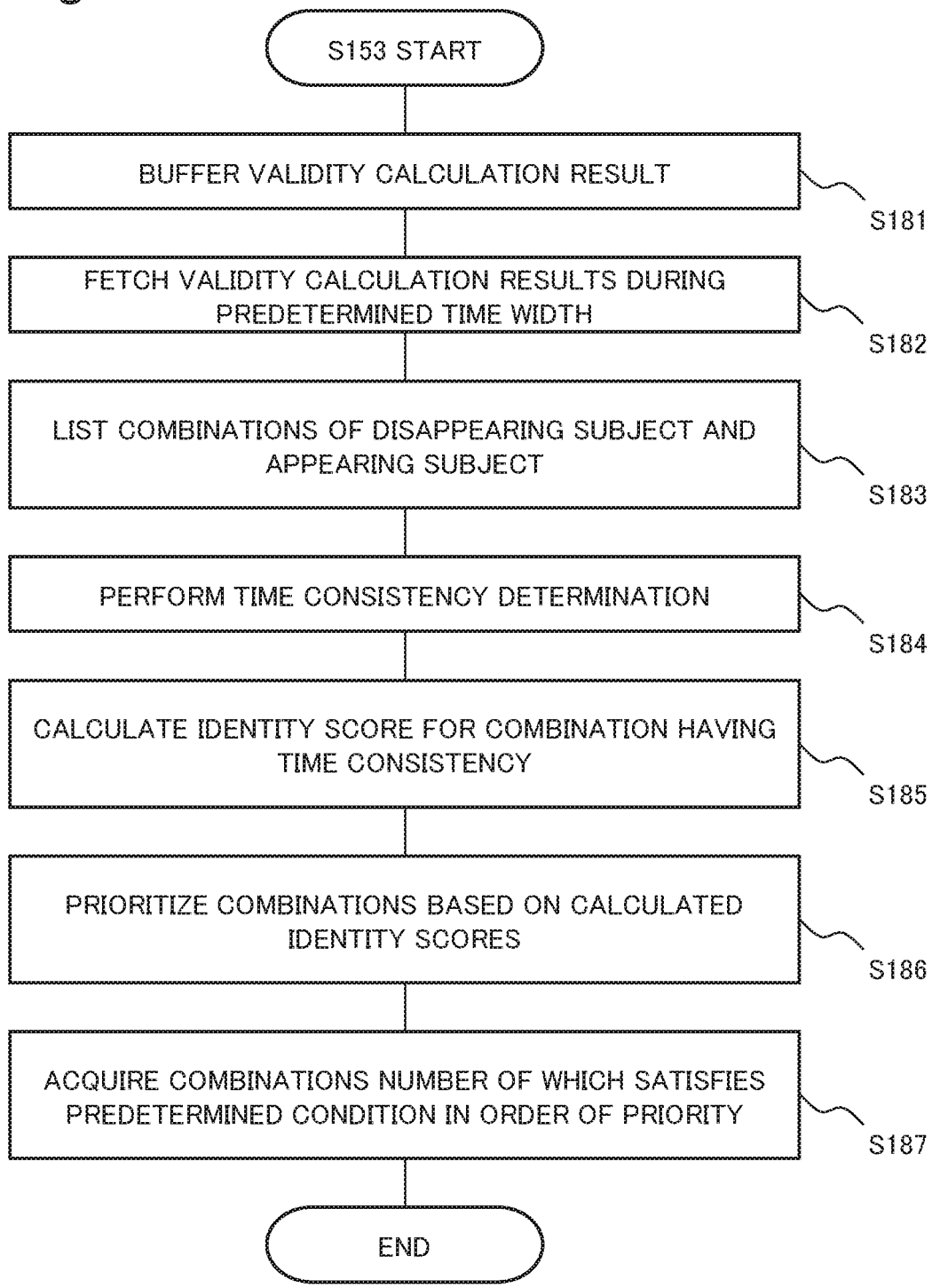
FIG. 18 is a flowchart illustrating an example of a flow of acquisition processing.

FIG. 18 is a flowchart illustrating an example of the flow of the acquisition processing in step S153 illustrated in FIG. 15. As illustrated in FIG. 18, the acquisition unit 2133 receives the validity calculation result 73 from the calculation unit 2132 and buffers the received validity calculation result 73 in a buffer (step S181). Next, the acquisition unit 2133 fetches the validity calculation result 73 during a predetermined time width from the buffer (step S182). The predetermined time width is not limited to a specific period and can be appropriately altered depending on types and places of video data.

Next, the acquisition unit 2133 lists, out of the validity calculation result 73, combinations of a disappearing subject and an appearing subject (step S183). The acquisition unit 2133 determines, with respect to each combination of subjects, whether or not a time at which the disappearing subject disappears and a time at which the appearing subject appears have consistency with each other (performs time consistency determination) (step S184).

Next, with respect to each combination that has time consistency, the acquisition unit 2133 calculates an identity score 116 that represents a degree of possibility that the subjects are identical to each other (step S185). The acquisition unit 2133 prioritizes the combinations, based on the calculated identity scores 116 (step S186). Next, the acquisition unit 2133, referring to the load condition information 2137, selects combinations in descending order of priorities until the number of selected combinations reaches a number set in the load condition information 2137 (step S187).

With this operation, the acquisition unit 2133 outputs subject disappearance data and subject appearance data in the selected combinations as an acquisition result. The matching unit 2138 is able to perform matching processing, based on the output acquisition result.

Figure 19:
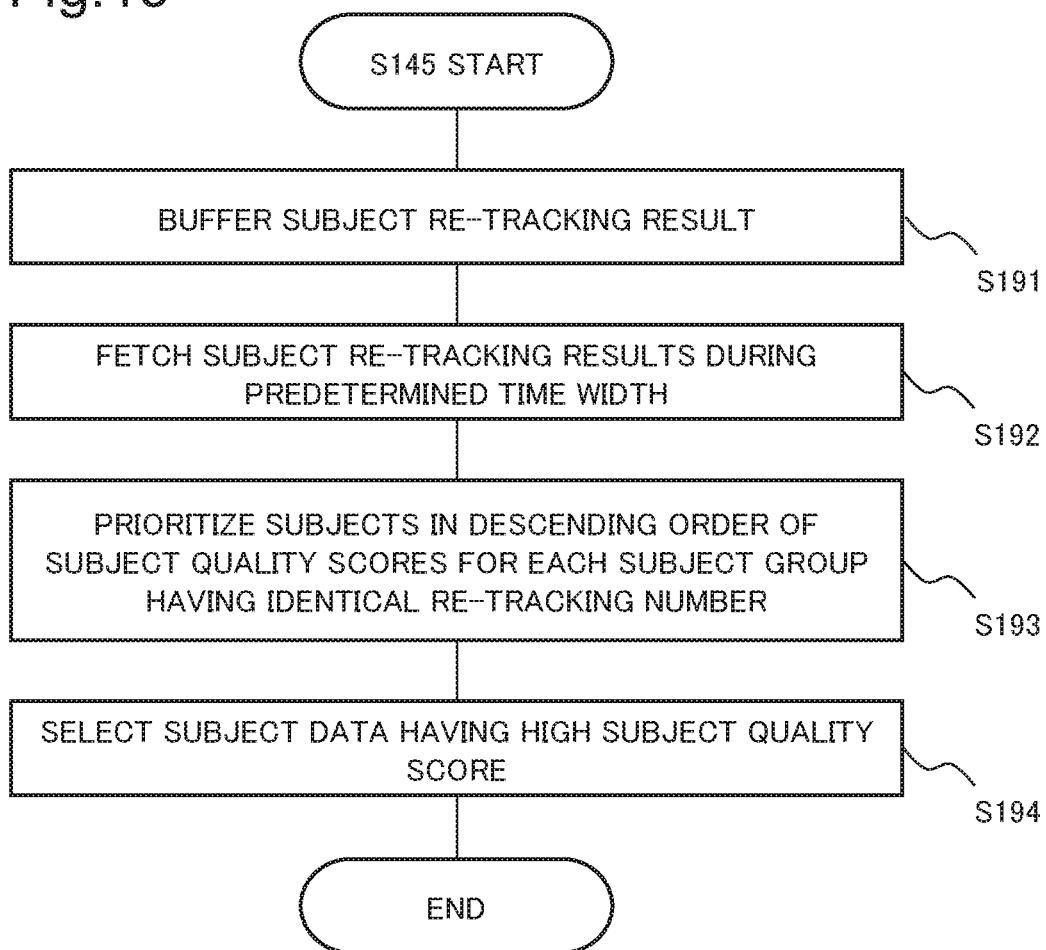
FIG. 19 is a flowchart illustrating an example of a flow of subject data selection processing.

FIG. 19 is a flowchart illustrating an example of the operation of the subject data selection processing in step S145 illustrated in FIG. 14. The subject selection unit 214 receives the subject re-tracking result 131 from the subject re-tracking unit 213 and buffers the received subject re-tracking result 131 in a buffer (step S191). Next, the subject selection unit 214 fetches the subject re-tracking result 131 during a predetermined time width from the buffer (step S192).

The subject selection unit 214 prioritizes, with respect to each group of subjects that have an identical re-tracking number 132, subjects in descending order of subject quality scores 45 (step S193). Next, the subject selection unit 214 outputs, with respect to each group of subjects that have an identical re-tracking number 132, subject data of subjects the subject quality scores 45 of which are higher than a predetermined threshold value or subjects that have priorities higher than or equal to a predetermined priority (step S194).

As described above, in the present example embodiment, the detection unit 2131 detects subject appearance data and subject disappearance data from subject data. The calculation unit 2132, using a past appearance position distribution and disappearance position distribution of subjects that are obtained through learning and the subject appearance data and the subject disappearance data, calculates appearance validity of the subject appearance data and disappearance validity of the subject disappearance data. The appearance validity of subject appearance data is a value indicating the validity that a subject included in the subject appearance data is an appearing subject, and the disappearance validity of the subject disappearance data is a value indicating the validity that a subject included in the subject disappearance data is a disappearing subject. The acquisition unit 2133 acquires, based on the appearance validity and the disappearance validity, a combination(s) of subject appearance data and subject disappearance data that satisfy(ies) a predetermined condition.

This operation enables the video monitoring system 100 including the subject re-tracking unit 213 to treat again subjects each of which was determined to be either a disappearing subject or an appearing subject because of occurrence of tracking interruption as subjects having a high possibility of being an identical subject. This capability enables the video monitoring system 100 to suppress increase in the amount of data that may occur due to tracking interruption.

In addition, the video monitoring system 100 acquires a combination(s) satisfying a predetermined condition from among the combinations of subject appearance data and subject disappearance data. The predetermined condition is, for example, a condition requiring the number of combinations to be less than or equal to a predetermined threshold value. This operation enables the video monitoring system 100 to control, to less than or equal to a predetermined threshold value, the amount of processing in the matching processing performed, on the occasion of tracking, between a subject(s) included in the subject disappearance data in the acquired combination(s) and a subject(s) included in the subject appearance data in the combination(s). This capability enables the video monitoring system 100 to limit a load required for the matching processing performed by the matching unit 2138.

Therefore, the video monitoring system 100 according to the present example embodiment, while enabling a processing load required to perform processing of, for example, extracting data effective for analysis of the video out of the video data to be reduced, enables increase in the amount of effective data caused by tracking interruption to be suppressed.

The above-described subject selection unit 214 may be included in the subject re-tracking unit 213.

The acquisition unit 2133 may specify, as a matching target candidate, subject appearance data that include, as the subject area 44 thereof, a position within a predetermined range from a position indicated by the subject area 44 included in subject disappearance data having a high disappearance validity 75, among the respective combinations illustrated in FIG. 11. That is, the acquisition unit 2133 may determine that, when, even if having a high disappearance validity 75, a subject is located apart from a position included in the subject appearance data of another subject, there is a high possibility that the subject disappearance data of the subject having a high disappearance validity 75 and the subject appearance data represent subjects different from each other. Therefore, the acquisition unit 2133 excludes such a combination of subjects that have a high possibility of being different subjects from matching target candidates. This configuration enables the acquisition unit 2133 to acquire only data more appropriate for matching.

(Specific Example)

Figure 20:
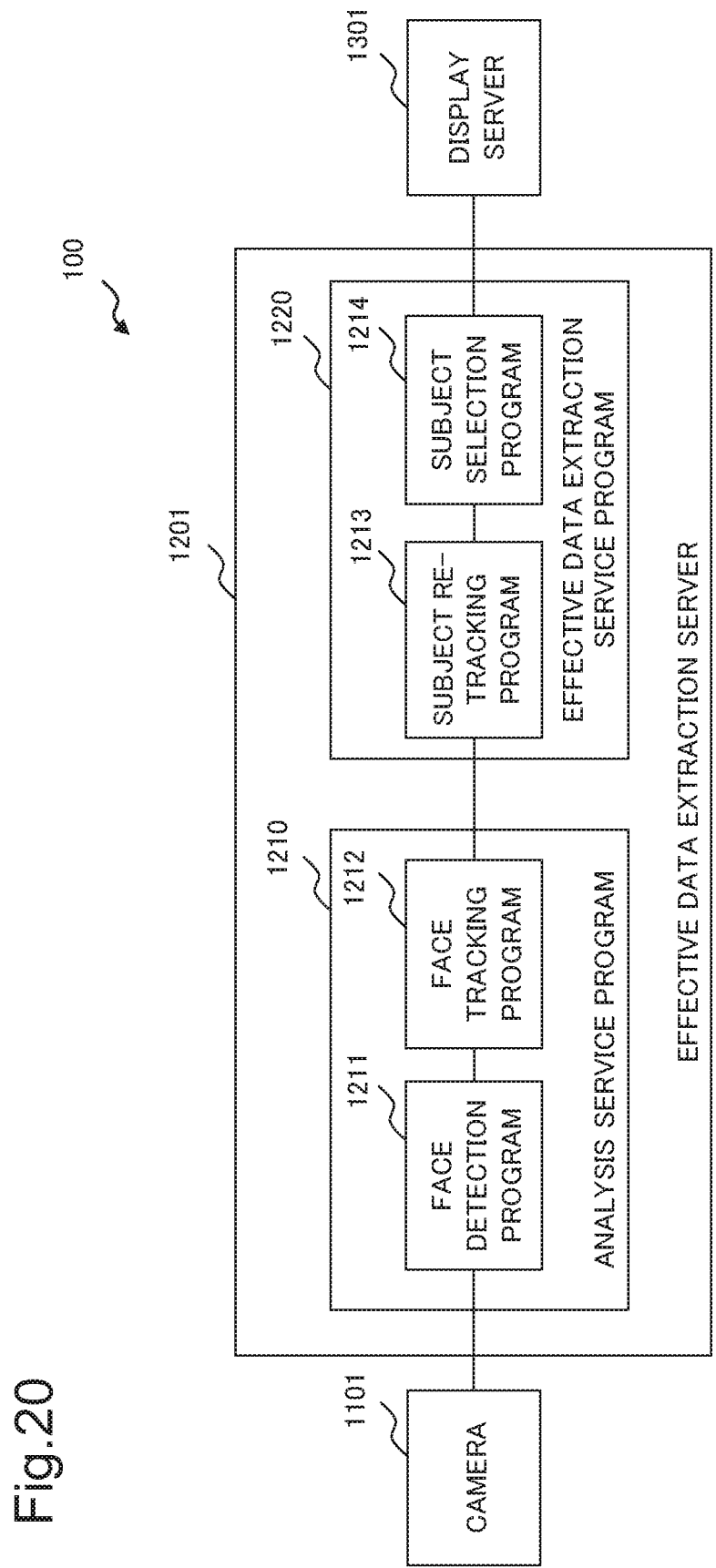
FIG. 20 is a diagram illustrating an example of a configuration of a specific example of application of the video monitoring system according to the second example embodiment.

A specific example of application of the video monitoring system 100 according to the present example embodiment is illustrated in FIG. 20. FIG. 20 is a diagram illustrating an example of a configuration of a specific example of application of the video monitoring system 100.

As illustrated in FIG. 20, the video monitoring system 100 includes a camera 1101, an effective data extraction server 1201, and a display server 1301. The camera 1101 is connected to the effective data extraction server 1201 via a network. The camera 1101 is an example of the video delivery device 101 described above.

The effective data extraction server 1201 is an example of the effective data extraction device 201. The effective data extraction server 1201 is a computer that operates controlled by a program. The effective data extraction server 1201 receives video data from the camera 1101 connected thereto via the network. As illustrated in FIG. 20, the effective data extraction server 1201 includes an analysis service program 1210 that provides an analysis service and an effective data extraction service program 1220 that provides an effective data extraction service. The analysis service program 1210 is an example of the analysis unit 210. The effective data extraction service program 1220 is an example of the effective data extraction unit 220. Each of the analysis service program 1210 and the effective data extraction service program 1220 is a set of programs that operate in the computer.

A face detection program 1211 is an example of the subject detection unit 211. The face detection program 1211 is a program that operates in the computer and detects a facial region of a person from video data. A face tracking program 1212 is an example of the subject tracking unit 212. The face tracking program 1212 is a program that operates in the computer and tracks a facial region of a person.

A subject re-tracking program 1213 is an example of the subject re-tracking unit 213. The subject re-tracking program 1213 is a program that operates in the computer and performs re-tracking of a subject. A subject selection program 1214 is an example of the subject selection unit 214. The subject selection program 1214 is a program that operates in the computer and performs selection of subject data.

The display server 1301 is an example of the display device 301. The display server 1301 is a computer that operates controlled by a program.

Figure 21:
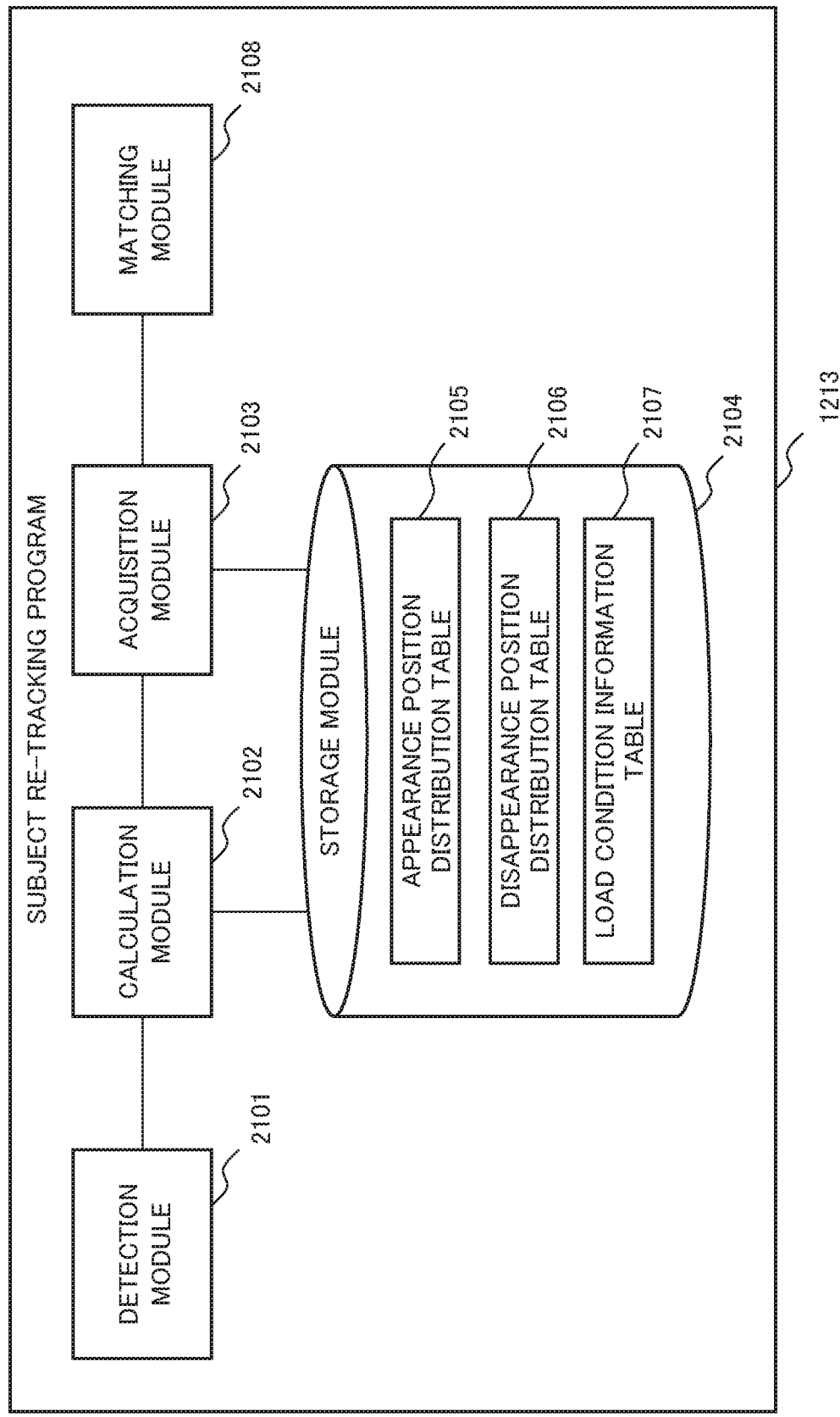
FIG. 21 is a block diagram illustrating a configuration of a subject re-tracking program.

FIG. 21 is a block diagram illustrating a configuration of the subject re-tracking program 1213. As illustrated in FIG. 21, the subject re-tracking program 1213 includes a detection module 2101, a calculation module 2102, an acquisition module 2103, a storage module 2104, and a matching module 2108.

The detection module 2101, the calculation module 2102, the acquisition module 2103, and the matching module 2108 are examples of the detection unit 2131, the calculation unit 2132, the acquisition unit 2133, and the matching unit 2138, respectively. The detection module 2101, the calculation module 2102, the acquisition module 2103, the storage module 2104, and the matching module 2108 are respectively software components that operate in the subject re-tracking program 1213. The storage module 2104 is an example of the storage unit 2134. The storage module 2104 includes an appearance position distribution table 2105, a disappearance position distribution table 2106, and a load condition information table 2107, which are arranged in a memory of the computer. The appearance position distribution table 2105, the disappearance position distribution table 2106, and the load condition information table 2107 are examples of the appearance position distribution 2135, the disappearance position distribution 2136, and the load condition information 2137, respectively. The appearance position distribution table 2105, the disappearance position distribution table 2106, and the load condition information table 2107 are, for example, respectively managed by a database management system.

Note that, in the specific example, it was cited as an example that the subject detection unit 211 was the face detection program 1211, which detects a facial region of a subject and thereby detects the subject. It was also cited as an example that the subject tracking unit 212 was the face tracking program 1212, which tracks the face of a subject and thereby tracks the subject. However, these are examples, and, in the detection and tracking of a subject, a portion other than the face may be used. For the detection and tracking of a subject, any method may be employed.

Note that, although, in the specific example, the description was made using, as an example, a case where the effective data extraction device 201 is achieved by a single effective data extraction server 1201, the analysis unit 210 and the effective data extraction unit 220 in the effective data extraction device 201 may be achieved by different devices.

Further, the subject detection unit 211 and the subject tracking unit 212 in the analysis unit 210 may be achieved by different devices, and the subject re-tracking unit 213 and the subject selection unit 214 in the effective data extraction unit 220 may also be achieved by different devices.

Figure 22:
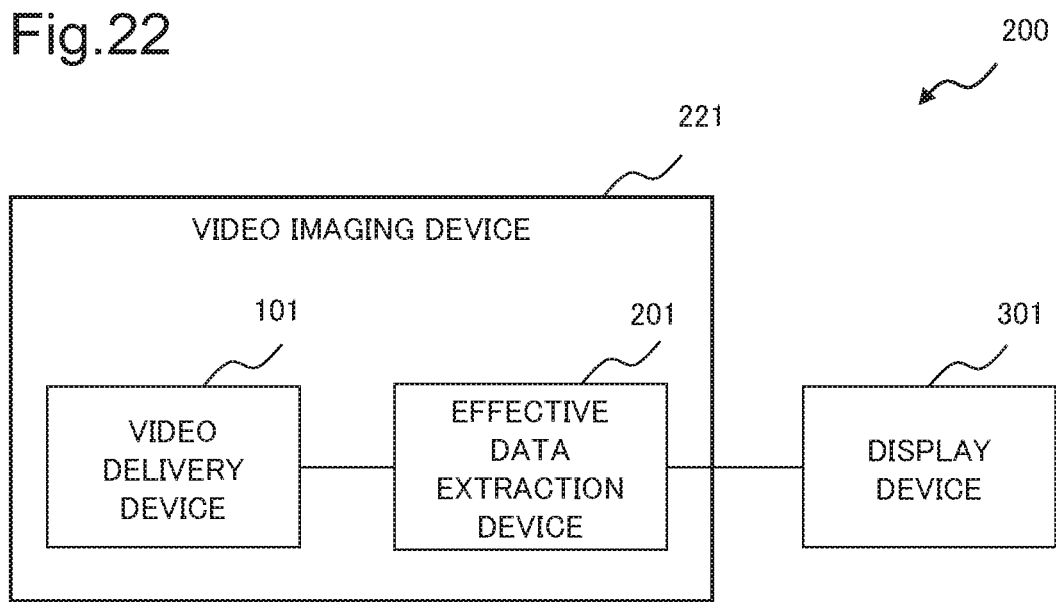
FIG. 22 is a diagram illustrating another example of the configuration of the video monitoring system.

Note that, although, in the specific example, the description was made using, as an example, a case where the video delivery device 101, the effective data extraction device 201, and the display device 301 are respectively achieved by different servers, the devices may be appropriately combined. For example, a configuration in which the video delivery device 101 and the effective data extraction device 201 are combined into one device may be employed. In FIG. 22, an example of a configuration of a video monitoring system 200 in the case where the video delivery device 101 and the effective data extraction device 201 are combined into one device is illustrated.

As illustrated in FIG. 22, the video monitoring system 200 includes a video imaging device 221 and a display device 301. The video imaging device 221 is, for example, a video imaging device that is referred to as an intelligent camera or a network camera. The video imaging device 221 has functions of the video delivery device 101 and the effective data extraction device 201. The functions of the video delivery device 101 and the effective data extraction device 201 are similar to the functions described in the second example embodiment.

The video delivery device 101 in the video imaging device 221 is a video imaging unit that performs video imaging processing, using, for example, a charge coupled device (CCD) or a complementary metal oxide semiconductor (CMOS) sensor and generates video data including a plurality of frames. The video delivery device 101 supplies generated video data to the effective data extraction device 201. This operation enables the effective data extraction device 201 to extract effective data from the video data. In this manner, the video delivery device 101 and the effective data extraction device 201 may be implemented as one device. This configuration enables processing of video-captured video data to be performed by the video imaging device 221 itself that has captured the video data. Even when such a configuration is employed, the video monitoring system 200 is capable of achieving similar effects to those achieved by the above-described video monitoring system 100.

Third Example Embodiment

Next, a third example embodiment of the present disclosure will be described. A configuration of a video monitoring system 100 in the present example embodiment is similar to the configuration of the video monitoring system 100 according to the second example embodiment. Although, in the second example embodiment, central coordinates were used as a subject area 44, information used as a subject area 44 is not limited to central coordinates. The information used as a subject area 44 may include, in addition to central coordinates, size and direction of a subject in frames.

In the present example embodiment, a configuration in which a subject area 44 includes central coordinates and size and direction of a subject will be described.

FIG. 23 is a diagram illustrating an example of a subject detection result 230 in the present example embodiment. The subject detection result 230 has a configuration in which, as subject areas 44 of a subject detection result 40, central coordinates and width, height, and direction of subjects are included. As illustrated in FIG. 23, the subject detection result 230 includes frame numbers 231, frame times 232, subject numbers 233, subject areas 234, and subject quality scores 235. Each subject area 234 includes central coordinates 2341, width 2342, height 2343, and direction 2344. The direction 2344 of a subject represents a degree of rotation in the horizontal direction of the subject when a direction in which the subject directly faces a video delivery device capturing video is used as a reference. For example, when a subject is assumed to be the face of a person, a rotation angle in the counterclockwise direction of the face of the person when a direction in which the face of the person directly faces a camera is assumed to be 0 degrees and the vertical direction of the face of the person is assumed to be the axis is defined to be a direction of the subject. An angle at which the left half of the face of a person is captured is −90 degrees, and an angle at which the right half of the face of a person is captured is 90 degrees. Note that the direction 2344 may be a degree of rotation in the vertical direction of the subject when a direction in which the subject directly faces a video delivery device capturing video is used as a reference, a degree of rotation in a rotational direction with respect to the optical axis of a video capturing device, or a combination of the degrees of rotation.

FIG. 24 is a diagram illustrating an example of subject detection data 240. A detection unit 2131, as with the above-described second example embodiment, associates appearance flags 242 and disappearance flags 243 with data including tracking numbers 241 assigned to the subject detection result 230 by a subject tracking unit 212 and outputs result data as subject detection data 240.

FIG. 25 is a diagram illustrating an example of an appearance position distribution 2135 in the present example embodiment. The appearance position distribution 2135 in the present example embodiment includes sub-region numbers 251, size 252, direction 253, x-coordinate ranges 254, y-coordinate ranges 255, appearance counts 256, and a total appearance count 257. The appearance position distribution 2135 in the present example embodiment has a configuration in which the size 252 and the direction 253 are included in the appearance position distribution 2135 in FIG. 8.

FIG. 26 is a diagram illustrating an example of disappearance position distribution 2136 in the present example embodiment. The disappearance position distribution 2136 in the present example embodiment, as with the appearance position distribution 2135, also has a configuration in which size 262 and direction 263 are included in the disappearance position distribution 2136 in FIG. 9.

In the examples in FIGS. 25 and 26, it is assumed that, as with the second example embodiment, an image of one frame includes 640×480 pixels. It is also assumed that a point at the top left corner, the horizontal direction, and the vertical direction of the image are the origin, the x-axis, and the y-axis, respectively. The appearance position distribution 2135 is a distribution obtained by classifying positions in an image into a mesh of 48 80×80 pixel regions, classifying the size (area) of subjects in an image into four classes, further classifying the direction of subjects into three classes, and recording an appearance count 256 with respect to each sub-region among in total 576 sub-regions created by combining the above regions and classes and a total appearance count 257. Similarly, the disappearance position distribution 2136 is a distribution obtained by recording a disappearance count 266 with respect to each sub-region among the above-described 576 sub-regions and a total disappearance count 267.

A calculation unit 2132 calculates appearance validity of each subject the appearance flag 242 of which is "1"

illustrated in FIG. 24. The calculation unit 2132, referring to the appearance position distribution 2135 illustrated in FIG. 25, acquires a past appearance count 256 with respect to a position at which each subject appears. The calculation unit 2132 also acquires the total appearance count 257. The calculation unit 2132, referring to the formula (1), calculates the appearance validity. Referring to FIG. 24, the central coordinates 2341, width 2342, height 2343, and direction 2344 of a subject with a subject number "201-1" are "(40, 40)", "30", "60", and "−10", respectively. Referring to FIG. 25, the subject with the subject number "201-1" is included in a sub-region the sub-region number 251 of which is "5", and the appearance count 256 in the sub-region is "40". The total appearance count 257 is "100". On this occasion, the appearance validity is calculated as described below.

Appearance validity=1−(40/100)=0.6

The calculation unit 2132 calculates disappearance validity of each subject the disappearance flag 243 of which is "1" illustrated in FIG. 24. The calculation unit 2132, referring to the disappearance position distribution 2136 illustrated in FIG. 26, acquires a past disappearance count 266 with respect to a position at which each subject disappears. The calculation unit 2132 also acquires the total disappearance count 267. The calculation unit 2132, referring to the formula (2), calculates the disappearance validity. Referring to FIG. 24, the central coordinates 2341, width 2342, height 2343, and direction 2344 of a subject with a subject number "202-1" are "(570, 410)", "100", "150", and "40", respectively. Referring to FIG. 26, the subject with the subject number "202-1" is included in a sub-region the sub-region number 261 of which is "575", and the disappearance count 266 in the sub-region is "70". The total disappearance count 267 is "100". On this occasion, the disappearance validity is calculated as described below.

Disappearance validity=1−(70/100)=0.3

In this manner, the calculation unit 2132 calculates the appearance validity and the disappearance validity. A validity calculation result 270 that is a result of the above calculation and calculation of appearance validity and disappearance validity with respect to the other subjects by the calculation unit 2132 is illustrated in FIG. 27. The calculation unit 2132 outputs the validity calculation result 270 as illustrated in FIG. 27. Using the validity calculation result 270, an acquisition unit 2133 acquires a combination(s) of subject appearance data and subject disappearance data.

For comparison, a case where the calculation unit 2132 calculates appearance validity without using the size of a subject in frames is now considered. Referring to FIG. 24, the central coordinates 2341 and direction 2344 of the subject the subject number 233 of which is "201-1" are "(40, 40)" and "−10", respectively. When the size of a subject in frames is not used, referring to FIG. 25, the subject the subject number 233 of which is "201-1" is included in sub-regions the sub-region numbers 251 of which are "5", "6", "7", and "8". The appearance count 256 in the sub-regions is 100 (=40+60). The total appearance count 257 is "100". On this occasion, the appearance validity is calculated as described below.

Appearance validity=1−(100/100)=0.0

In a similar manner, the appearance validity of a subject with the subject number 233 of which is "201-2" is also calculated as 0.0.

While, when the size of a subject in frames is used, the appearance validity of the subject number 233 of which is "201-1" and the subject number 233 of which is "202-1" are "0.6" and "0.4", respectively, both appearance validity values become "0.0" when the size of a subject in frames is not used. That is, use of the size of a subject in frames in the calculation of appearance validity and disappearance validity enables the calculation unit 2132 to calculate the appearance validity and the disappearance validity in a distinguishing manner even when subjects appear or disappear at the same position in frames. This capability is particularly effective in a case of, in a video scene in which persons move from the back of the screen to the front, discriminating a case where a person suddenly appears at the front due to hiding.

Similarly, use of the direction of a subject in frames enables the calculation unit 2132 to calculate the appearance validity and the disappearance validity in a distinguishing manner even when subjects appear or disappear at the same position in frames with the same size. This capability is particularly effective in a case of, in a video scene in which persons appear facing front and disappear facing sideways, discriminating a case where a person suddenly disappears facing front due to hiding.

(Hardware Configuration)

Figure 28:
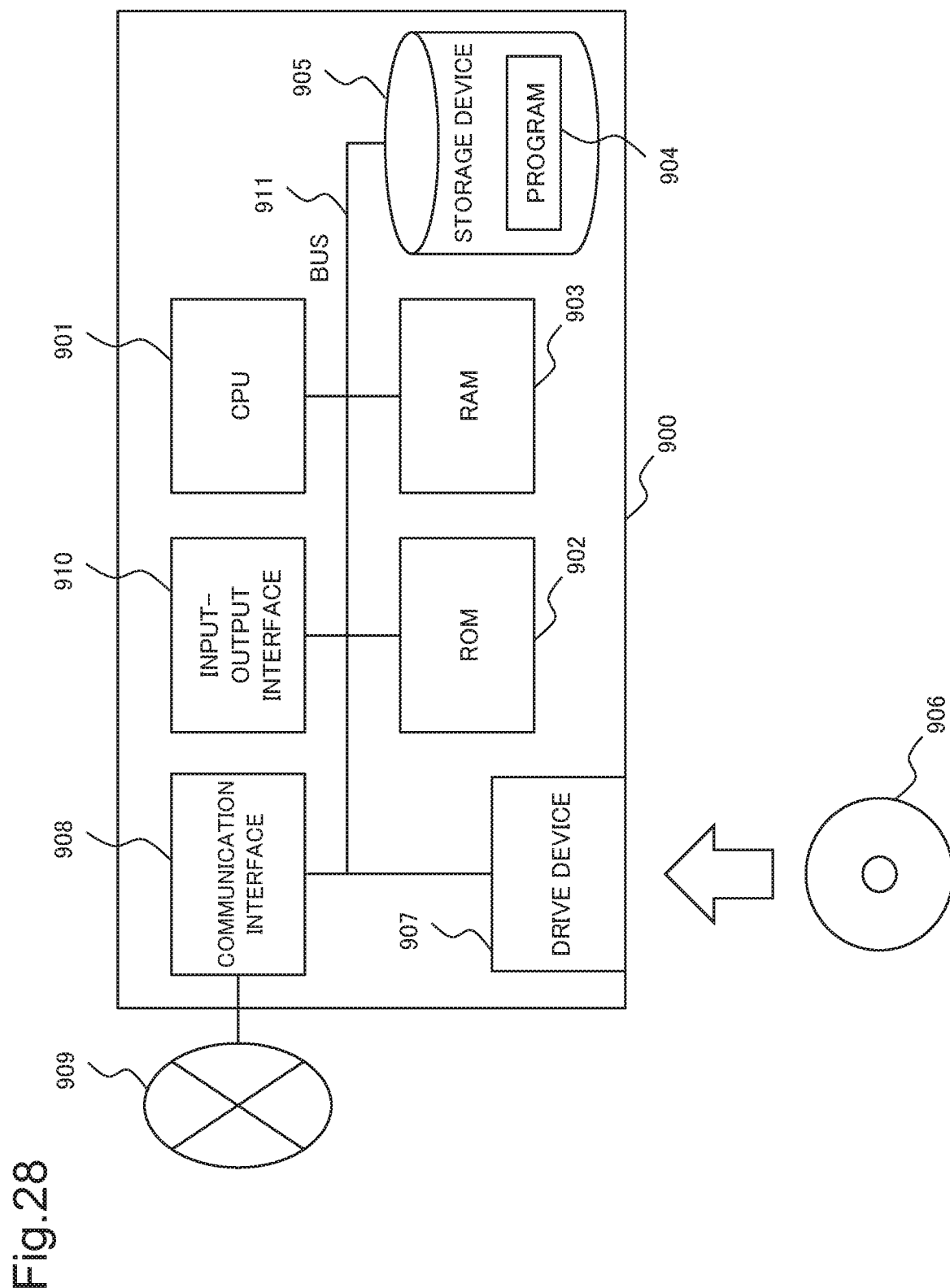
FIG. 28 is a diagram exemplarily describing a hardware configuration of a computer (information processing device) that is capable of achieving the respective example embodiments of the present disclosure.

In the respective example embodiments of the present invention, the respective constituent elements of the respective devices indicate blocks of functional units. All or part of the respective constituent elements of the respective devices are achieved by an arbitrary combination of, for example, an information processing device 900 as illustrated in FIG. 28 and programs. FIG. 28 is a block diagram illustrating an example of a hardware configuration of the information processing device 900, which achieves the respective constituent elements of the respective devices. The information processing device 900 includes, as an example, the following components:

a central processing unit (CPU) 901;
a read only memory (ROM) 902;
a random access memory (RAM) 903;
programs 904 loaded in the RAM 903;
a storage device 905 storing the programs 904;
a drive device 907 performing reading and writing from and to a recording medium 906;
a communication interface 908 connecting to a communication network 909;
an input-output interface 910 performing inputting and outputting of data; and
a bus 911 interconnecting the respective constituent elements.

The respective constituent elements of the respective devices in the respective example embodiments are achieved by the CPU 901 acquiring and executing the programs 904 achieving the above-described functions. The programs 904, which achieve the functions of the respective constituent elements of the respective devices, are, for example, stored in the storage device 905 and the RAM 903 in advance and read by the CPU 901 as needed basis. Note that it may be configured such that the programs 904 are supplied to the CPU 901 via the communication network 909 or such that the programs 904 are stored in the recording medium 906 in advance and the drive device 907 reads and supplies the programs 904 to the CPU 901.

For the achieving method of the respective devices, various variations are conceivable. For example, each device may be achieved by, with respect to each constituent element, an arbitrary combination of a different information processing device 900 and programs. A plurality of constituent elements included in each device may be achieved by an arbitrary combination of a single information processing device 900 and programs.

All or part of the respective constituent elements of the respective devices are achieved by other general-purpose or dedicated circuits, processors, or the like or a combination thereof. The circuits or processors may be configured with a single chip or a plurality of chips interconnected via a bus.

All or part of the respective constituent elements of the respective devices may be achieved by a combination of the above-described circuits or the like and programs.

When all or part of the respective constituent elements of the respective devices are achieved by a plurality of information processing devices, circuits, or the like, the plurality of information processing devices, circuits, or the like may be arranged in a centralized manner or in a decentralized manner. For example, information processing devices, circuits, or the like may be achieved in a mode in which respective information processing devices, circuits, or the like are interconnected via a communication network, such as a client and server system and a cloud computing system.

Note that the above-described respective example embodiments are suitable example embodiments for the present invention, the scope of the present invention is not limited to only the above-described respective example embodiments, and those skilled in the art can make modification and substitution of the above-described respective example embodiments without departing from the scope of the present invention and thereby construct embodiments to which various modifications are applied.

The present disclosure can be applied to uses such as an analysis system that analyzes subjects from video captured by a camera and displays an analysis result and a program for achieving such an analysis system in a computer.

All or part of the embodiments described above may be described as in the following supplementary notes, but the present invention is not limited thereto.

(Supplementary Note 1)
An image processing device including:
a detection means for, from input subject data that include positions of a plurality of subjects, detecting subject appearance data including an appearing subject and subject disappearance data including a disappearing subject;
a calculation means for, based on subject appearance data and subject disappearance data that are detected by the detection means and an appearance position distribution and disappearance position distribution of subjects that are learned in advance, calculating appearance validity of the subject appearance data and disappearance validity of the subject disappearance data; and
an acquisition means for, based on appearance validity and disappearance validity calculated by the calculation means, acquiring a combination of subject appearance data and subject disappearance data detected by the detection means, the combination satisfying a predetermined condition.

(Supplementary Note 2)
The image processing device according to supplementary note 1, in which
the acquisition means acquires combinations of the subject appearance data and the subject disappearance data, the number of the combinations being less than or equal to a predetermined threshold value.

(Supplementary Note 3)
The image processing device according to supplementary note 1 or 2, in which the appearance position distribution is a distribution obtained by, with respect to each of regions into which a screen is partitioned along a vertical direction and a horizontal direction, recording frequency of appearance at which the subjects first appear in the subject data at the region, and
when a position of the appearing subject is in a region where the frequency of appearance is lower, the calculation means calculates the appearance validity in such a way that the appearing subject included in the subject appearance data is determined to be a subject the tracking of which is interrupted.

(Supplementary Note 4)
The image processing device according to supplementary note 3, in which
the appearance position distribution is a distribution obtained by, with respect to each of sub-regions into which the regions are further partitioned according to size of the subjects in frames and direction of the subjects in frames, recording frequency of appearance at which the subjects first appear in the subject data at the sub-region.

(Supplementary Note 5)
The image processing device according to supplementary note 4, in which
the appearance position distribution includes at least one of a position, size, and direction of each subject when the subject appears in video data including frames associated with the subject data, and
the calculation means calculates the appearance validity, based on at least one of the position, the size, and the direction.

(Supplementary Note 6)
The image processing device according to any one of supplementary notes 1 to 5, in which
the disappearance position distribution is a distribution obtained by, with respect to each of regions into which a screen is partitioned along a vertical direction and a horizontal direction, recording frequency of disappearance at which the subjects disappear from the subject data at the region, and
when a position of the disappearing subject is in a region where the frequency of disappearance is lower, the calculation means calculates the disappearance validity in such a way that the disappearing subject included in the subject appearance data is determined to be a subject the tracking of which is interrupted.

(Supplementary Note 7)
The image processing device according to supplementary note 6, in which
the disappearance position distribution is a distribution obtained by, with respect to each of sub-regions into which the regions are further partitioned according to size of the subjects in frames and direction of the subjects in frames, recording frequency of disappearance at which the subjects disappear from the subject data at the sub-region.

(Supplementary Note 8)
The image processing device according to supplementary note 7, in which
the disappearance position distribution includes at least one of a position, size, and direction of each subject when the subject disappears from video data including frames associated with the subject data, and
the calculation means calculates the disappearance validity, based on at least one of the position, the size, and the direction.

(Supplementary Note 9)
The image processing device according to any one of supplementary notes 1 to 8, in which the acquisition means acquires a combination of the subject appearance data and the subject disappearance data in which a time at which the disappearing subject included in the subject disappearance data is video-captured is earlier than a time at which the appearing subject included in the subject appearance data is video-captured.

(Supplementary Note 10)

The image processing device according to any one of supplementary notes 1 to 9, in which the acquisition means acquires a combination of the subject appearance data and the subject disappearance data in which a position of the disappearing subject included in the subject disappearance data and a position of the appearing subject included in the subject appearance data are within a predetermined range.

(Supplementary Note 11)

The image processing device according to any one of supplementary notes 1 to 10 further including a matching means for matching subjects included in a combination that the acquisition means acquired with each other.

(Supplementary Note 12)

The image processing device according to supplementary note 11 further including a subject selection means for, based on a result of matching by the matching means, using subject quality scores each of which represents quality of a subject and that are calculated using a video capturing condition of the subjects, selecting, out of the subject data, subject data satisfying another predetermined condition.

(Supplementary Note 13)

A video monitoring system including:

a subject detection means for, from video data obtained by video-capturing a plurality of subjects, detecting the subjects;

a subject tracking means for tracking the detected subjects and outputting tracking results including positions of the subjects as subject data;

a detection means for, from the subject data, detecting subject appearance data including an appearing subject and subject disappearance data including a disappearing subject;

a calculation means for, based on subject appearance data and subject disappearance data that are detected by the detection means and an appearance position distribution and disappearance position distribution of subjects that are learned in advance, calculating appearance validity of the subject appearance data and disappearance validity of the subject disappearance data;

an acquisition means for, based on appearance validity and disappearance validity calculated by the calculation means, acquiring a combination of subject appearance data and subject disappearance data detected by the detection means, the combination satisfying a predetermined condition;

a matching means for matching subjects included in a combination that the acquisition means acquired with each other; and a subject selection means for, based on a result of matching by the matching means, using subject quality scores each of which represents quality of a subject and that are calculated using a video capturing condition of the subjects, selecting, out of the subject data, subject data satisfying another predetermined condition.

(Supplementary Note 14)

The video monitoring system according to supplementary note 13, in which the acquisition means acquires combinations of the subject appearance data and the subject disappearance data, the number of the combinations being less than or equal to a predetermined threshold value.

(Supplementary Note 15)

The video monitoring system according to supplementary note 13 or 14, in which the appearance position distribution is a distribution obtained by, with respect to each of regions into which a screen is partitioned along a vertical direction and a horizontal direction, recording frequency of appearance at which the subjects first appear in the subject data at the region, and when a position of the appearing subject is in a region where the frequency of appearance is lower, the calculation means calculates the appearance validity in such a way that the appearing subject included in the subject appearance data is determined to be a subject the tracking of which is interrupted.

(Supplementary Note 16)

The video monitoring system according to supplementary note 15, in which the appearance position distribution is a distribution obtained by, with respect to each of sub-regions into which the regions are further partitioned according to size of the subjects in frames and direction of the subjects in frames, recording frequency of appearance at which the subjects first appear in the subject data at the sub-region.

(Supplementary Note 17)

The video monitoring system according to supplementary note 16, in which the appearance position distribution includes at least one of a position, size, and direction of each subject when the subject appears in video data including frames associated with the subject data, and the calculation means calculates the appearance validity, based on at least one of the position, the size, and the direction.

(Supplementary Note 18)

The video monitoring system according to any one of supplementary notes 13 to 17, in which the disappearance position distribution is a distribution obtained by, with respect to each of regions into which a screen is partitioned along a vertical direction and a horizontal direction, recording frequency of disappearance at which the subjects disappear from the subject data at the region, and when a position of the disappearing subject is in a region where the frequency of disappearance is lower, the calculation means calculates the disappearance validity in such a way that the disappearing subject included in the subject appearance data is determined to be a subject the tracking of which is interrupted.

(Supplementary Note 19)

The video monitoring system according to supplementary note 18, in which the disappearance position distribution is a distribution obtained by, with respect to each of sub-regions into which the regions are further partitioned according to size of the subjects in frames and direction of the subjects in frames, recording frequency of disappearance at which the subjects disappear from the subject data at the sub-region.

(Supplementary Note 20)

The video monitoring system according to supplementary note 19, in which the disappearance position distribution includes at least one of a position, size, and direction of each subject when the subject disappears from video data including frames associated with the subject data, and the calculation means calculates the disappearance validity, based on at least one of the position, the size, and the direction.

(Supplementary Note 21)

The video monitoring system according to any one of supplementary notes 13 to 20, in which the acquisition means acquires a combination of the subject appearance data and the subject disappearance data in which a time at which the disappearing subject included in the subject disappearance data is video-captured is earlier than a time at which the appearing subject included in the subject appearance data is video-captured.

(Supplementary Note 22)

The video monitoring system according to any one of supplementary notes 13 to 21, in which the acquisition means acquires a combination of the subject appearance data and the subject disappearance data in which a position of the disappearing subject included in the subject disappearance data and a position of the appearing subject included in the subject appearance data are within a predetermined range.

(Supplementary Note 23)

The video monitoring system according to any one of supplementary notes 13 to 22 further including a video capturing means for video-capturing the subjects.

(Supplementary Note 24)

The video monitoring system according to supplementary note 23, in which the video monitoring system is an intelligent camera.

(Supplementary Note 25)

An image processing method including:

from input subject data that include positions of a plurality of subjects, detecting subject appearance data including an appearing subject and subject disappearance data including a disappearing subject;

based on the detected subject appearance data and subject disappearance data and an appearance position distribution and disappearance position distribution of subjects that are learned in advance, calculating appearance validity of the subject appearance data and disappearance validity of the subject disappearance data;

based on the calculated appearance validity and disappearance validity, acquiring a combination of the detected subject appearance data and subject disappearance data, the combination satisfying a predetermined condition.

(Supplementary Note 26)

The image processing device according to supplementary note 25 including acquiring combinations of the subject appearance data and the subject disappearance data, the number of the combinations being less than or equal to a predetermined threshold value.

(Supplementary Note 27)

A video monitoring method including:

from video data obtained by video-capturing a plurality of subjects, detecting the subjects;

tracking the detected subjects and outputting tracking results including positions of the subjects as subject data;

from the subject data, detecting subject appearance data including an appearing subject and subject disappearance data including a disappearing subject;

based on the detected subject appearance data and subject disappearance data and an appearance position distribution and disappearance position distribution of subjects that are learned in advance, calculating appearance validity of the subject appearance data and disappearance validity of the subject disappearance data;

based on the calculated appearance validity and disappearance validity, acquiring a combination of subject appearance data and subject disappearance data detected by the detection means, the combination satisfying a predetermined condition;

matching subjects included in the acquired combination with each other; and based on a result of matching, using subject quality scores each of which represents quality of a subject and that are calculated using a video capturing condition of the subjects, selecting, out of the subject data, subject data satisfying another predetermined condition.

(Supplementary Note 28)

The video monitoring method according to supplementary note 27 including acquiring combinations of the subject appearance data and the subject disappearance data, the number of the combinations being less than or equal to a predetermined threshold value.

(Supplementary Note 29)

A program causing a computer to perform:

detection processing of, from input subject data that include positions of a plurality of subjects, detecting subject appearance data including an appearing subject and subject disappearance data including a disappearing subject;

calculation processing of, based on the detected subject appearance data and subject disappearance data and an appearance position distribution and disappearance position distribution of subjects that are learned in advance, calculating appearance validity of the subject appearance data and disappearance validity of the subject disappearance data; and acquisition processing of, based on the calculated appearance validity and disappearance validity, acquiring a combination of the detected subject appearance data and subject disappearance data, the combination satisfying a predetermined condition.

(Supplementary Note 30)

The program according to supplementary note 29, in which the acquisition processing acquires combinations of the subject appearance data and the subject disappearance data, the number of the combinations being less than or equal to a predetermined threshold value.

This application claims priority based on Japanese Patent Application No. 2017-000653, filed on Jan. 5, 2017, the entire disclosure of which is incorporated herein by reference.

REFERENCE SIGNS LIST

10 Image processing device
11 Detection unit
12 Calculation unit
13 Acquisition unit
100 Video monitoring system
101 Video delivery device
201 Effective data extraction device
210 Analysis unit
211 Subject detection unit
212 Subject tracking unit
213 Subject re-tracking unit
2131 Detection unit
2132 Calculation unit 2133 Acquisition unit
2134 Storage unit
2135 Appearance position distribution
2136 Disappearance position distribution
2137 Load condition information
2138 Matching unit
214 Subject selection unit
220 Effective data extraction unit
301 Display device
40 Subject detection result
50 Subject tracking result
70 Subject detection data
73 Validity calculation result
111 Combination result
131 Subject re-tracking result
200 Video monitoring system
221 Video imaging device
230 Subject detection result
240 Subject detection data
270 Validity calculation result

The invention claimed is:

1. An image processing device comprising:
at least one memory storing instructions; and
at least one processor configured to execute the instructions to:
acquire at least one combination of an appearance data value and a disappearance data value from a plurality of appearance data values and a plurality of disappearance data values based on a first relation and a second relation such that a load of matching the appearance data value and the disappearance data value included in the at least one combination satisfies a load condition, the plurality of appearance data values each representing information on appearances of subjects in images, the plurality of disappearance data values each representing information on disappearances of subjects in the images, the first relation being a relation between the plurality of appearance data values and an appearance position distribution, the second relation being a relation between the plurality of disappearance data values and an disappearance position distribution; and
perform matching the appearance data value and the disappearance data value included in the at least one combination.

2. The image processing device according to claim 1, wherein
each the plurality of appearance data values indicates an appearance position,
each of the plurality of disappearance data values indicates a disappearance position, and
the at least one processor is further configured to execute the set of instructions to
acquire the at least one combination based on the first relation and the second relation, the first relation representing infrequency of appearance at an appearance position indicated by the appearance data value in the appearance position distribution, the second relation representing infrequency of appearance at a disappearance position indicated by the disappearance data value in the disappearance position distribution.

3. The image processing device according to claim 1, wherein
each of the plurality of appearance data values indicates time of an appearance represented by the each of the plurality of appearance data values,
each of the plurality of disappearance data values indicates time of a disappearance represented by the each of the plurality of disappearance data values, and
the at least one processor is further configured to execute the set of instructions to
acquire the at least one combination such that time of the disappearance indicated by the disappearance data value included in each of the at least one combination is earlier than time of the appearance indicated by the appearance data value included in the each of the at least one combination.

4. The image processing device according to claim 1, wherein
each of the plurality of appearance data values indicates an appearance position,
each of the plurality of disappearance data values indicates a disappearance position, and
the at least one processor is further configured to execute the set of instructions to
acquire the at least one combination such that a relative relation between the appearance position and the disappearance position satisfy a position condition, the disappearance position being indicated by the disappearance data value included in each of the at least one combination, the appearance position being indicated by the appearance data value included in the each of the at least one combination.

5. The image processing device according to claim 1, wherein
the at least one processor is further configured to execute the set of instructions to
acquire the at least one combination such that the load satisfies the load condition that a matching number of performing the matching is equal to or smaller than a maximum matching number.

6. The image processing device according to claim 1, wherein
the at least one processor is further configured to execute the set of instructions to
acquire the at least one combination such that the load satisfies the load condition that a matching number of performing the matching within a predetermined time period is equal to or smaller than a maximum matching number.

7. An image processing method comprising:
acquiring at least one combination of an appearance data value and a disappearance data value from a plurality of appearance data values and a plurality of disappearance data values based on a first relation and a second relation such that a load of matching the appearance data value and the disappearance data value included in the at least one combination satisfies a load condition, the plurality of appearance data values each representing information on appearances of subjects in images, the plurality of disappearance data values each representing information on disappearances of subjects in the images, the first relation being a relation between the plurality of appearance data values and an appearance position distribution, the second relation being a relation between the plurality of disappearance data values and an disappearance position distribution; and
performing matching the appearance data value and the disappearance data value included in the at least one combination.

8. The image processing method according to claim 7, wherein each the plurality of appearance data values indicates an appearance position, each of the plurality of disappearance data values indicates a disappearance position, and the acquiring includes acquiring the at least one combination based on the first relation and the second relation, the first relation representing infrequency of appearance at an appearance position indicated by the appearance data value in the appearance position distribution, the second relation representing infrequency of appearance at a disappearance position indicated by the disappearance data value in the disappearance position distribution.

9. The image processing method according to claim 7, wherein each of the plurality of appearance data values indicates time of an appearance represented by the each of the plurality of appearance data values, each of the plurality of disappearance data values indicates time of a disappearance represented by the each of the plurality of disappearance data values, and the acquiring includes acquiring the at least one combination such that time of the disappearance indicated by the disappearance data value included in each of the at least one combination is earlier than time of the appearance indicated by the appearance data value included in the each of the at least one combination.

10. The image processing method according to claim 7, wherein each of the plurality of appearance data values indicates an appearance position, each of the plurality of disappearance data values indicates a disappearance position, and the acquiring includes acquiring the at least one combination such that a relative relation between the appearance position and the disappearance position satisfy a position condition, the disappearance position being indicated by the disappearance data value included in each of the at least one combination, the appearance position being indicated by the appearance data value included in the each of the at least one combination.

11. The image processing method according to claim 7, wherein the acquiring includes acquiring the at least one combination such that the load satisfies the load condition that a matching number of performing the matching is equal to or smaller than a maximum matching number.

12. The image processing method according to claim 7, wherein the acquiring includes acquiring the at least one combination such that the load satisfies the load condition that a matching number of performing the matching within a predetermined time period is equal to or smaller than a maximum matching number.

13. A non-transitory computer readable storage medium storing a program causing a computer to execute:

acquisition processing of acquiring at least one combination of an appearance data value and a disappearance data value from a plurality of appearance data values and a plurality of disappearance data values based on a first relation and a second relation such that a load of matching the appearance data value and the disappearance data value included in the at least one combination satisfies a load condition, the plurality of appearance data values each representing information on appearances of subjects in images, the plurality of disappearance data values each representing information on disappearances of subjects in the images, the first relation being a relation between the plurality of appearance data values and an appearance position distribution, the second relation being a relation between the plurality of disappearance data values and an disappearance position distribution; and matching processing of performing matching the appearance data value and the disappearance data value included in the at least one combination.

14. The storage medium according to claim 13, wherein each the plurality of appearance data values indicates an appearance position, each of the plurality of disappearance data values indicates a disappearance position, and the acquisition processing acquires the at least one combination based on the first relation and the second relation, the first relation representing infrequency of appearance at an appearance position indicated by the appearance data value in the appearance position distribution, the second relation representing infrequency of appearance at a disappearance position indicated by the disappearance data value in the disappearance position distribution.

15. The storage medium according to claim 13, wherein each of the plurality of appearance data values indicates time of an appearance represented by the each of the plurality of appearance data values, each of the plurality of disappearance data values indicates time of a disappearance represented by the each of the plurality of disappearance data values, and the acquisition processing acquires the at least one combination such that time of the disappearance indicated by the disappearance data value included in each of the at least one combination is earlier than time of the appearance indicated by the appearance data value included in the each of the at least one combination.

16. The storage medium according to claim 13, wherein each of the plurality of appearance data values indicates an appearance position, each of the plurality of disappearance data values indicates a disappearance position, and the acquisition processing acquires the at least one combination such that a relative relation between the appearance position and the disappearance position satisfy a position condition, the disappearance position being indicated by the disappearance data value included in each of the at least one combination, the appearance position being indicated by the appearance data value included in the each of the at least one combination.

17. The storage medium device according to claim 13, wherein the acquisition processing acquires the at least one combination such that the load satisfies the load condition that a matching number of performing the matching is equal to or smaller than a maximum matching number.

18. The storage medium according to claim 13, wherein the acquisition processing acquires the at least one combination such that the load satisfies the load condition that a matching number of performing the matching within a predetermined time period is equal to or smaller than a maximum matching number.

* * * * *